US012656603B2

(12) United States Patent
Bhagat et al.

(10) Patent No.: US 12,656,603 B2
(45) Date of Patent: *Jun. 16, 2026

(54) COLOR-SELECTIVE WAVEGUIDES FOR AUGMENTED REALITY/MIXED REALITY APPLICATIONS

(71) Applicant: MAGIC LEAP, INC., Plantation, FL (US)

(72) Inventors: Sharad D. Bhagat, Austin, TX (US); David Carl Jurbergs, Austin, TX (US); Ryan Jason Ong, Austin, TX (US); Christophe Peroz, San Francisco, CA (US); Chieh Chang, Cedar Park, TX (US); Ling Li, Cedar Park, TX (US)

(73) Assignee: Magic Leap, Inc., Plantation, FL (US)

( * ) Notice: Subject to any disclaimer, the term of this patent is extended or adjusted under 35 U.S.C. 154(b) by 90 days.

This patent is subject to a terminal disclaimer.

(21) Appl. No.: 18/654,811

(22) Filed: May 3, 2024

(65) Prior Publication Data

US 2024/0302652 A1 Sep. 12, 2024

Related U.S. Application Data

(63) Continuation of application No. 17/715,730, filed on Apr. 7, 2022, now Pat. No. 11,994,670, which is a
(Continued)

(51) Int. Cl.
*G02B 27/00* (2006.01)
*B29D 11/00* (2006.01)
(Continued)

(52) U.S. Cl.
CPC .... *G02B 27/0025* (2013.01); *B29D 11/00663* (2013.01); *G02B 5/22* (2013.01);
(Continued)

(58) Field of Classification Search
CPC .. B29D 11/00663; G02B 5/22; G02B 6/0026; B29K 2995/002
See application file for complete search history.

(56) References Cited

U.S. PATENT DOCUMENTS

| | | | |
|---|---|---|---|
| 10,371,896 B2 | 8/2019 | Yeoh et al. | |
| 10,551,568 B2 | 2/2020 | Yeoh et al. | |
| | (Continued) | | |

FOREIGN PATENT DOCUMENTS

| | | |
|---|---|---|
| AU | 2021203240 A1 | 6/2021 |
| CN | 102393544 A | 3/2012 |
| | (Continued) | |

OTHER PUBLICATIONS

International Preliminary Report on Patentability received for PCT Patent Application No. PCT/US20/54828, mailed on Apr. 21, 2022, 7 pages.
(Continued)

*Primary Examiner* — Sung H Pak
(74) *Attorney, Agent, or Firm* — Zi Y. Wong; Via LLP

(57) ABSTRACT

Color-selective waveguides, methods for fabricating color-selective waveguides, and augmented reality (AR)/mixed reality (MR) applications including color-selective waveguides are described. The color-selective waveguides can advantageously reduce or block stray light entering a waveguide (e.g., red, green, or blue waveguide), thereby reducing or eliminating back-reflection or back-scattering into the eyepiece.

20 Claims, 22 Drawing Sheets

Related U.S. Application Data continuation of application No. 17/065,905, filed on Oct. 8, 2020, now Pat. No. 11,307,408.

(60) Provisional application No. 63/057,412, filed on Jul. 28, 2020, provisional application No. 62/912,949, filed on Oct. 9, 2019, provisional application No. 62/912,305, filed on Oct. 8, 2019.

(51) Int. Cl.
  *F21V 8/00* (2006.01)
  *G02B 5/22* (2006.01)

(52) U.S. Cl.
  CPC ......... *G02B 6/0026* (2013.01); *G02B 6/0065* (2013.01); *G02B 27/0081* (2013.01); *B29K 2995/002* (2013.01)

(56) References Cited

U.S. PATENT DOCUMENTS

| | | | |
|---|---|---|---|
| 11,307,408 | B2 | 4/2022 | Bhagat |
| 11,994,670 | B2 * | 5/2024 | Bhagat .................... G02B 5/22 |
| 2010/0158441 | A1 | 6/2010 | Mickelson et al. |
| 2016/0116739 | A1 | 4/2016 | Tekolste et al. |
| 2016/0154243 | A1 | 6/2016 | Aiki |
| 2017/0156388 | A1 | 6/2017 | Gallardo |
| 2017/0235142 | A1 | 8/2017 | Wall |
| 2017/0248789 | A1 | 8/2017 | Yokoyama |
| 2018/0180817 | A1 | 6/2018 | Yeoh et al. |
| 2018/0267312 | A1 | 9/2018 | Melli |

| | | | |
|---|---|---|---|
| 2019/0111642 | A1 | 4/2019 | Chang et al. |
| 2019/0243142 | A1 | 8/2019 | Tekolste et al. |
| 2021/0103142 | A1 | 4/2021 | Bhagat et al. |
| 2022/0026718 | A1 | 1/2022 | Yeoh et al. |
| 2022/0229290 | A1 | 7/2022 | Bhagat |

FOREIGN PATENT DOCUMENTS

| | | | |
|---|---|---|---|
| CN | 107111204 | A | 8/2017 |
| CN | 107430217 | A | 12/2017 |
| CN | 109416432 | A | 3/2019 |
| JP | 2004199032 | | 7/2004 |
| JP | 2017502350 | | 1/2017 |
| JP | 2017156388 | | 9/2017 |
| WO | 2015/097169 | A1 | 7/2015 |
| WO | 2017/196999 | A1 | 11/2017 |
| WO | 2019/079480 | A1 | 4/2019 |
| WO | 2019117588 | | 6/2019 |
| WO | 2019/195193 | A1 | 10/2019 |

OTHER PUBLICATIONS

International Search Report and Written Opinion received for PCT Patent Application No. PCT/US20/54828, mailed on Jan. 12, 2021, 7 pages.

Office Action in Chinese Appln. No. 202080081991.4, dated Nov. 23, 2022, 15 pages (with English translation).

Supplementary European Search Report and Search Opinion received for EP Application No. 20874650.3, mailed on Sep. 21, 2023, 9 pages.

\* cited by examiner

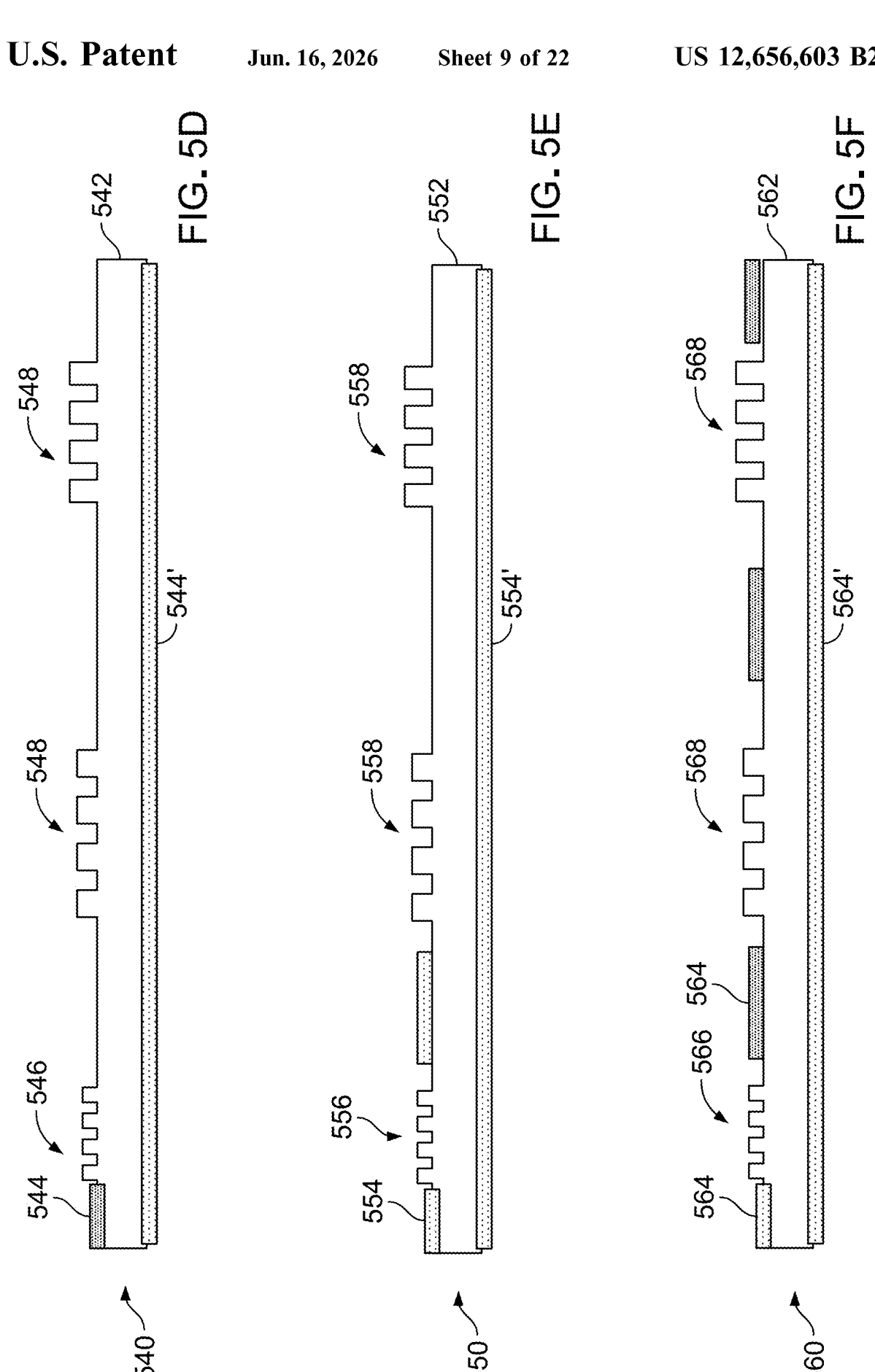

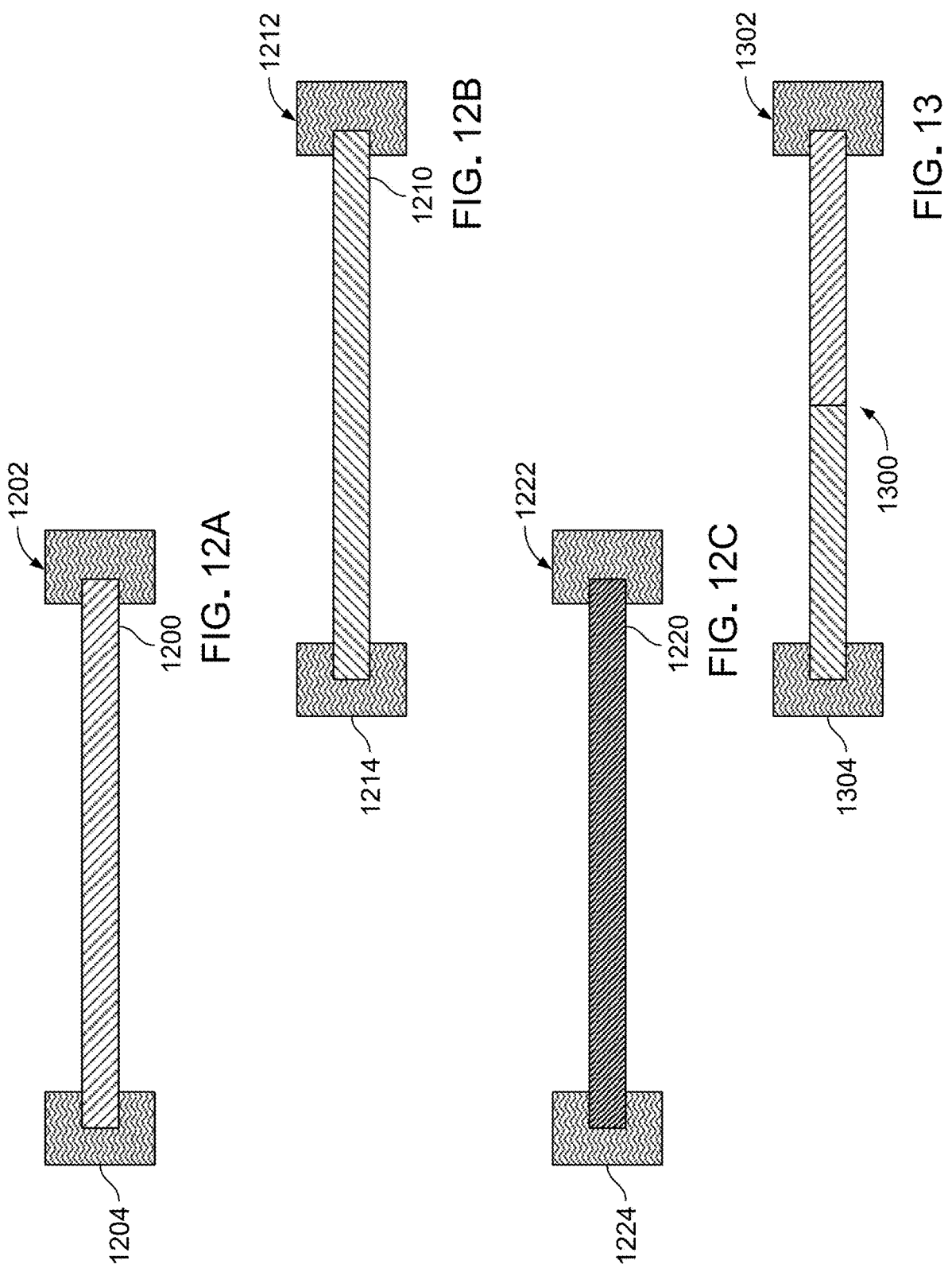

COLOR-SELECTIVE WAVEGUIDES FOR AUGMENTED REALITY/MIXED REALITY APPLICATIONS

CROSS-REFERENCE TO RELATED APPLICATIONS

This application is a continuation of U.S. patent application Ser. No. 17/715,730 filed on Apr. 7, 2022, which is a continuation of U.S. patent application Ser. No. 17/065,905 filed on Oct. 8, 2020 (now U.S. Pat. No. 11,307,408, issued Apr. 19, 2022), which claims the benefit of U.S. Patent Application Nos. 62/912,305 filed Oct. 8, 2019; 62/912,949 filed Oct. 9, 2019; and 63/057,412 filed Jul. 28, 2020, all of which are hereby incorporated by reference herein in their entirety.

TECHNICAL FIELD

This invention relates to color-selective waveguides and implementation of color-selective waveguides for augmented reality (AR)/mixed reality (MR) applications.

BACKGROUND

Typically, augmented reality (AR)/mixed reality (MR) eyepiece stacks are composed of separate red (R), green (G), blue (B) waveguide layers stacked together with gaps of a few tens of microns between the successive layers. Multi-pupil liquid crystal on silicon (LCOS) projectors are designed to direct light from each color into the respective incoupling grating (ICG) (e.g., green light into the ICG of the green waveguide layer). However, stray light (often from diffraction at the LCOS) from the wrong color can propagate into a neighboring ICG due to the necessary close proximity of the ICGs in the super-pupil. The stray light can induce ghost images or reduce optical properties such as contrast.

SUMMARY

Embodiments of the present disclosure are generally directed to color-selective waveguides, methods for fabricating color-selective waveguides, and augmented reality (AR)/mixed reality (MR) applications including color-selective waveguides. In particular, color-selective waveguides described herein can advantageously reduce or block stray light entering a waveguide (e.g., red, green, or blue waveguide), thereby reducing or eliminating back-reflection or back-scattering into the eyepiece.

In a first general aspect, forming a polymer waveguide includes dispensing a first polymerizable material on a first region of a first mold, dispensing a second polymerizable material on a second region of the first mold, contacting the first polymerizable material and the second polymerizable material with a second mold, polymerizing the first polymerizable material and the second polymerizable material to yield a patterned polymer layer between the first mold and the second mold, and separating the patterned polymer layer from the first mold and the second mold to yield a polymer waveguide having an undoped region formed by the first polymerizable material and a doped region formed by the second polymerizable material. The first polymerizable material includes a first resin, and the second polymerizable material includes a second resin and a chromatic component. The first mold, the second mold, or both include protrusions, recessions, or both.

Implementations of the first general aspect may include one or more of the following features.

In one implementation, the chromatic component is selected to allow transmission of a selected wavelength of light. A concentration of the chromatic component in the second polymerizable material can be in a range of 3-3000 parts per million by weight. The selected wavelength of light typically corresponds to red, green, or blue light. The chromatic component includes one or more dyes. In some cases, the chromatic component includes a nano-particulate material, and optionally one or more dyes. In some implementations, the first resin and the second resin are the same. The polymer waveguide can include more than one doped region, more than one undoped region, or more than one doped region and more than one undoped region.

A second general aspect includes a polymer waveguide formed by the first general aspect.

In a third general aspect, a polymer waveguide includes an undoped region including a first resin, and a doped region including a second resin and a chromatic component. The undoped region and the doped region have substantially the same index of refraction. In some implementations of the third general aspect, the chromatic component is selected to absorb red light, green light, blue light, or any combination thereof.

In a fourth general aspect, forming a polymer waveguide includes dispensing a polymerizable material on a first mold, contacting the polymerizable material with a second mold, polymerizing the polymerizable material to yield a patterned polymer layer between the first mold and the second mold, and separating the patterned polymer layer from the first mold and the second mold to yield a doped polymer waveguide. The polymerizable material includes a resin and a chromatic component. The first mold, the second mold, or both include protrusions, recessions, or both. The chromatic component is selected to absorb red light, green light, blue light, or any combination thereof.

Implementations of the fourth general aspect may include one or more of the following features.

In some implementations, the doped polymer waveguide is free of one or more undoped regions. The doped polymer waveguide typically absorbs at least 90% of one or more of red light, green light, and blue light traveling through the polymer waveguide. In certain cases, the chromatic component is selected to absorb at least 90% of only red light, only green light, or only blue light. In some cases, the polymerizable material is a homogeneous mixture. A thickness of the doped polymer waveguide is typically in a range of about 200 $\mu$m to about 1000 $\mu$m. A total internal reflection path length of the doped polymer waveguide is typically in a range of about 2 cm to about 15 cm. A refractive index of the doped polymer waveguide is usually greater than about 1.45.

The fourth general aspect can include casting or molding. Polymerizing the polymerizable material can include irradiating the polymerizable material with ultraviolet radiation.

In a fifth general aspect, a polymer waveguide includes one or more patterned regions and one or more unpatterned regions. The one or more patterned regions and one or more unpatterned regions include a doped polymer having a chromatic component selected to absorb at least 90% of one or more of red light, green light, and blue light traveling through the polymer waveguide.

Implementations of the fifth general aspect may include one or more of the following features.

The one of the one or more patterned regions can be an incoupling grating, an exit pupil expander, or an orthogonal pupil expander. The doped polymer waveguide is typically free of one or more undoped regions. The absorb at least 90% of only red light, only green light, or only blue light. The doped polymer waveguide can absorb at least 90% of one or more of red light, green light, and blue light traveling through the polymer waveguide, or at least 90% of only red light, only green light, or only blue light. The doped polymer can be a homogeneous material. A thickness of the doped polymer waveguide is typically in a range of about 200 μm to about 1000 μm. A total internal reflection path length of the doped polymer waveguide is typically in a range of about 2 cm to about 15 cm. A refractive index of the doped polymer waveguide is typically greater than about 1.45.

An additional aspect includes an eyepiece including the polymer waveguide of the fifth general aspect.

In a sixth general aspect, coating a waveguide includes dispensing one or more portions of a polymerizable material on a first surface of a waveguide, and polymerizing the polymerizable material to yield a doped coating on the first surface of the waveguide. The polymerizable material includes a resin and a chromatic component. The waveguide can be formed of glass or polymer. The doped coating is selected to absorb at least 90% of one or more of red light, green light, and blue light traveling through the polymer waveguide.

Implementations of the sixth general aspect may include one or more of the following features.

In some cases, the doped coating can be a continuous coating. In certain cases, the doped coating forms two or more discontinuous regions on the first surface of the waveguide. The doped coating typically covers the first surface of the waveguide. The first surface of the waveguide can include one or more patterned regions and one or more unpatterned regions, with the polymerizable material is dispensed on one of the one or more unpatterned regions of the first surface of the waveguide. The waveguide and the doped coating can have substantially the same index of refraction.

The sixth general aspect may further include dispensing one or more additional portions of the polymerizable material on a second surface of the waveguide, and polymerizing the one or more additional portions of the polymerizable material to yield a second doped coating on the second surface of the waveguide. The second surface is opposite the first surface, and the second doped coating is selected to absorb at least 90% of one or more of red light, green light, and blue light traveling through the polymer waveguide.

In a seventh general aspect, a coated waveguide includes one or more unpatterned regions on a first surface, and one or more patterned regions on the first surface. At least one of the one or more unpatterned regions is coated with a doped polymer coating, and the doped polymer coating is selected to absorb at least 90% of one or more of red light, green light, and blue light traveling through the polymer waveguide. In some implementations of the seventh general aspect, a second surface of the waveguide, opposite the first surface, includes an additional doped polymer coating.

In an eighth general aspect, coating a waveguide includes dispensing a portion of a first polymerizable material on a first surface of a waveguide, dispensing a portion of a second polymerizable material on the first surface of the waveguide, and polymerizing the first polymerizable material and the second polymerizable material to yield a first doped coating and a second doped coating on the first surface of the waveguide. The first polymerizable material includes a first resin and a first chromatic component. The second polymerizable material includes a second resin and a second chromatic component. The first doped coating is selected to absorb at least 90% of a first one or more of red light, green light, and blue light traveling through the polymer waveguide, and the second doped coating is selected to absorb at least 90% of a second one or more of red light, green light, and blue light traveling through the polymer waveguide.

In a ninth general aspect, fabricating color filters includes dispensing a portion of a first polymerizable material on a surface of a first mold, dispensing a portion of a second polymerizable material on the surface of the first mold, and dispensing a portion of a third polymerizable material on the surface of the first mold. Fabricating color filters further includes contacting the first polymerizable material, the second polymerizable material, and the third polymerizable material with a surface of a second mold, and polymerizing the first polymerizable material, the second polymerizable material, and the third polymerizable material to yield a first color filter, a second color filter, and a third color filter. The first polymerizable material includes a first resin and a first chromatic component, and the second polymerizable material includes a second resin and a second chromatic component. The third polymerizable material includes a third resin and a third chromatic component. The first colored filter is selected to absorb at least 90% of a first one or more of red light, green light, and blue light traveling through the first colored filter; the second colored filter is selected to absorb at least 90% of a second one or more of red light, green light, and blue light traveling through the second colored filter; and the third colored filter is selected to absorb at least 90% of a third one or more of red light, green light, and blue light traveling through the third colored filter. In some implementations, the ninth general aspect further includes adhering the first colored filter, the second colored filter, and the third colored filter to an optical substrate or a waveguide.

In a tenth general aspect, a polymer waveguide includes an incoupling grating and a pupil expander. The polymer waveguide includes a polymer doped with a chromatic component. A concentration of the chromatic component in the polymer varies from a first side of the polymer waveguide to a second side of the polymer waveguide. In some implementations of the tenth general aspect, the concentration of the chromatic component increases from a first side of the polymer waveguide to a second side of the polymer waveguide.

An eleventh general aspect includes a waveguide formed by any of the above general aspects.

A twelfth general aspect includes an eyepiece including two or more of the waveguides of the eleventh general aspect.

A thirteenth general aspect includes a device including the eyepiece of the twelfth general aspect.

In a fourteenth general aspect, a waveguide structure includes a waveguide configured to transmit light in a visible wavelength range, and a cured adhesive doped with a colorant that absorbs light in the visible wavelength range and transmits ultraviolet light. The cured adhesive is in direct contact with the waveguide.

Implementations of the fourteenth general aspect may include one or more of the following features.

In some cases, the visible wavelength range can correspond to red, green, or blue light or any combination thereof. In certain cases, the visible wavelength range corresponds to cyan, magenta, or yellow light or any combination thereof. The cured adhesive is typically a single layer having a thickness in a range of about 10 μm to about 1.5 mm. The cured adhesive can be completely cured. The cured adhesive typically forms an edge seal.

In a fifteenth general aspect, a waveguide stack includes a multiplicity of waveguide structures, and a cured adhesive doped with a colorant that absorbs light in each of the different visible wavelength ranges and transmits ultraviolet light. Each waveguide structure has a waveguide configured to transmit light in a different visible wavelength range, and the adhesive is in direct contact with adjacent waveguide structures in the multiplicity of waveguide structures. In some implementations of the fifteenth general aspect, the cured adhesive is a single layer having a thickness in a range of about 10 μm to about 1.5 mm. In certain implementations of the fifteenth general aspect, the cured adhesive forms an edge seal.

In a sixteenth general aspect, forming a waveguide structure includes selecting a waveguide configured to transmit light in a visible wavelength range, applying to the waveguide an adhesive doped with a colorant that absorbs light in the visible wavelength range and transmits ultraviolet light, and fully curing the adhesive with a single application of ultraviolet light to yield the waveguide structure. The adhesive has a thickness in a range of about 10 μm to about 1.5 mm. In some implementations of the sixteenth general aspect, the adhesive is applied to an edge of the waveguide or to a surface of the layer configured for lamination to another waveguide configured to transmit visible light in another visible wavelength range.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIGS. 5A-5F depict local and global coating of dye-doped resin onto glass or polymer waveguides for color selectiveness.

FIGS. 12A-12C show red, green, and blue edge absorbers with colorant absorption spectra tailored directly to color channels in a waveguide.

FIG. 13 depicts an edge absorber with green and blue portions.

DETAILED DESCRIPTION

Current incoupling grating (ICG) designs have limited wavelength selectivity, such that stray light of an undesired wavelength is sometimes injected into the waveguide. In one example, a green ICG diffracts some portion of blue and red light, which gets coupled into the waveguide as "stray light." The presence of stray light in a waveguide can degrade its optical performance. In some cases, light at the edge of a waveguide is back-reflected or back-scattered into an eyepiece, thereby eroding contrast.

Figure 1A:
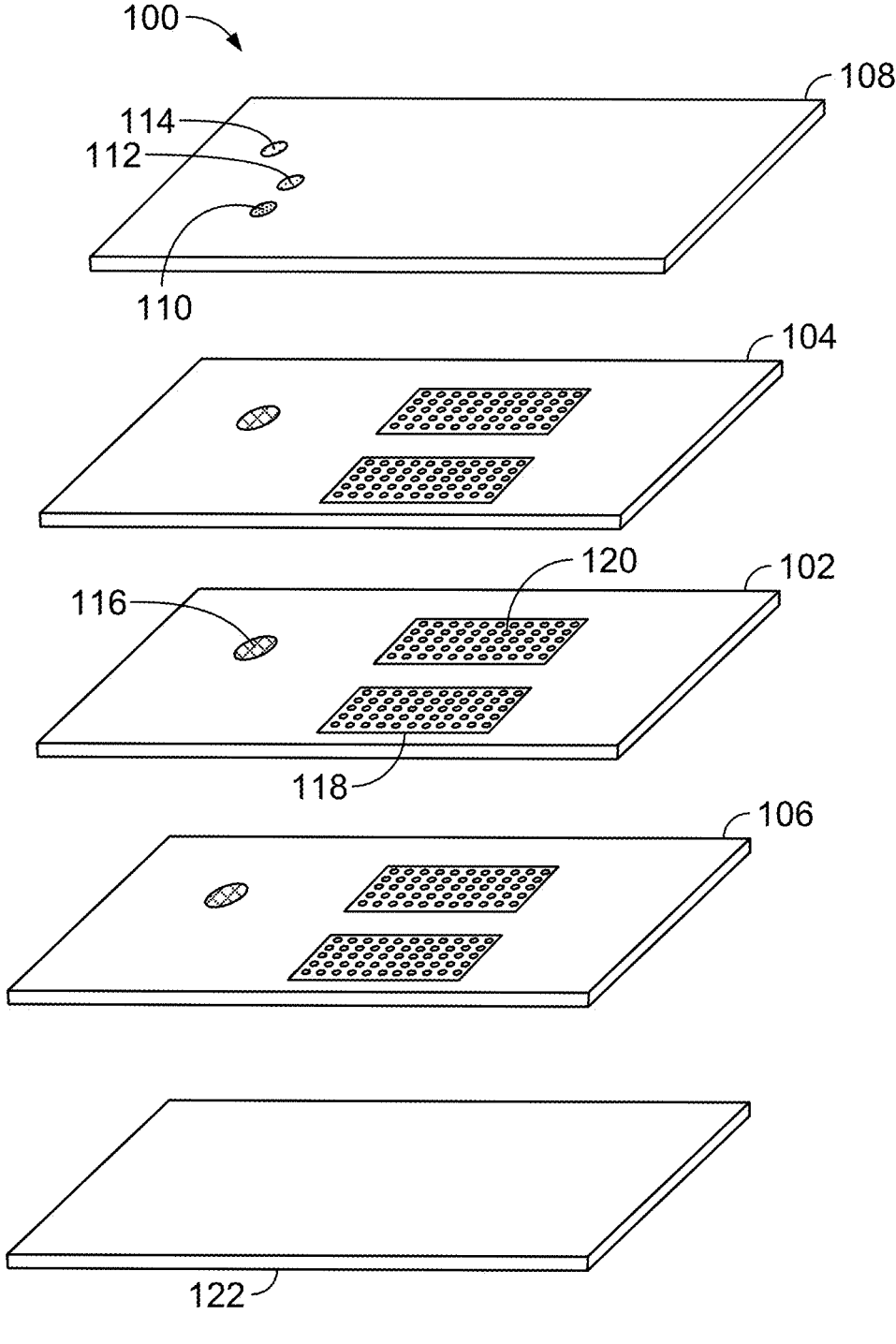
FIGS. 1A and 1B depict color filters and optical transmission through these color filters, respectively.
Figure 1B:
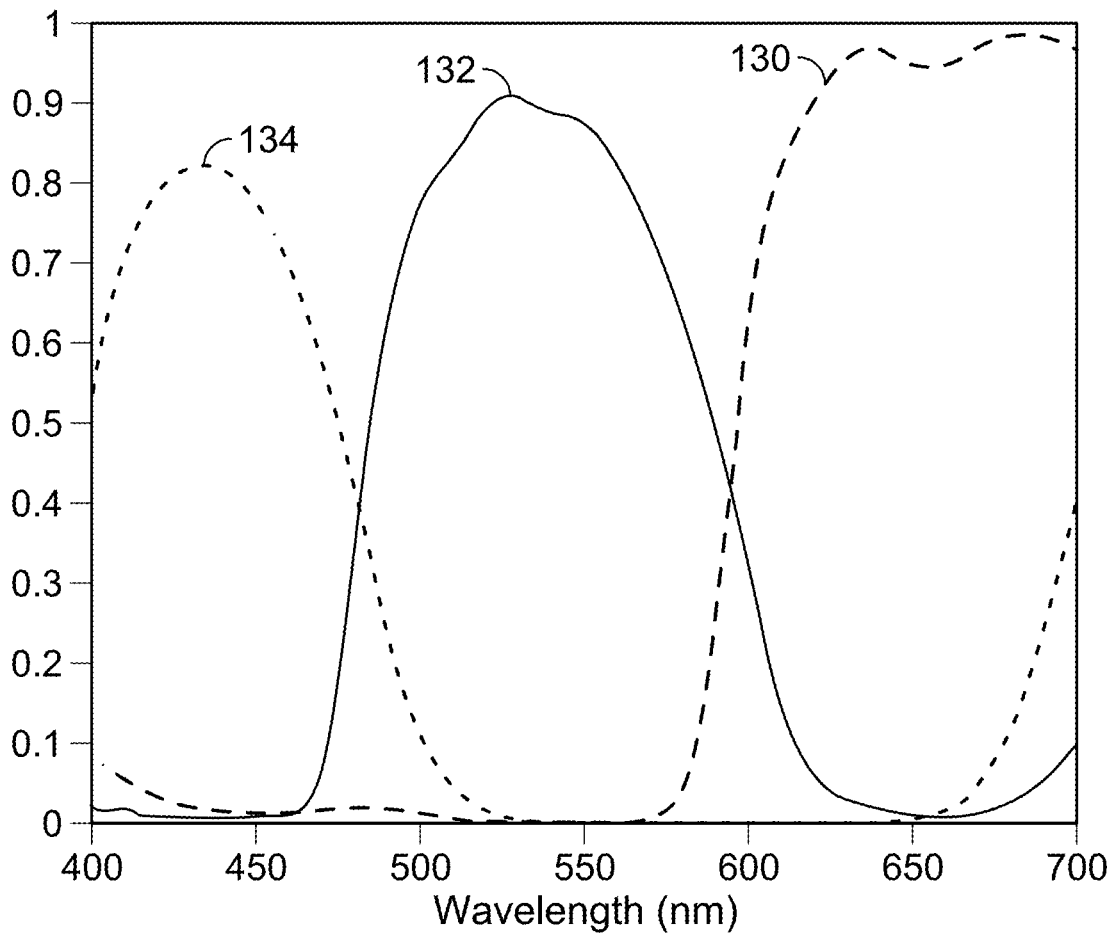

One way to mitigate the coupling of stray light into a waveguide is to use a color filter that selectively lets a single color pass through and blocks other colors that would otherwise end up as unwanted light in the waveguide. FIG. 1A depicts an exploded view of glass-based eyepiece stack 100 with red, green, and blue color filters 102, 104, 106, respectively, on eye side cover layer 108. Red, green, and blue color filters 110, 112, 114, respectively are typically used to selectively transmit RGB light into corresponding red, green, and blue waveguides 102, 104, 106, respectively, while absorbing other colors. RGB waveguides include incoupling gratings (ICG) 116, exit pupil expanders (EPE) 118, and orthogonal pupil expanders (OPE) 120, respectively. Red, green, and blue waveguides 102, 104, 106 are positioned between eye side cover layer 108 and world side cover layer 122. FIG. 1B depicts the spectral response 130, 132, 134 of red, green, and blue color filters, respectively, shown in FIG. 1A. Due at least in part to differences in thermal expansion and high-precision alignment requirements of certain optical designs, however, it can be difficult to integrate a glass color filter with a polymer eyepiece. Doing so can introduce complexity and cost that is not present in glass eyepieces.

Color-selective polymer waveguide eyepieces that mitigate coupling of stray light into waveguides are described herein. In some cases, the polymer of a specific color eyepiece layer is doped with one or more dyes or particles with selected chromatic properties to attenuate undesired wavelengths of coupled light (e.g., a green eyepiece layer is doped with green dye on the optical path). In one example, a high refractive index (R.I.) resin used for polymer waveguide fabrication is loaded with a desired color dye to allow light of a certain wavelength range to pass through and block all other wavelengths. As used herein, "high refractive index" generally refers to a R.I. at 587.56 nm (R.I., nd) greater than about 1.45 or greater then about 1.5. The amount of light of a specific color that gets blocked by a specific dye is based at least in part on the concentration of the dye in the polymer.

Figure 2A:
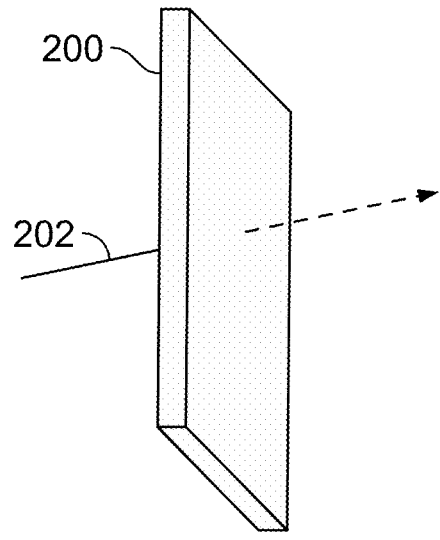
FIGS. 2A and 2B depict dye-doped waveguides for color filtration.
Figure 2B:
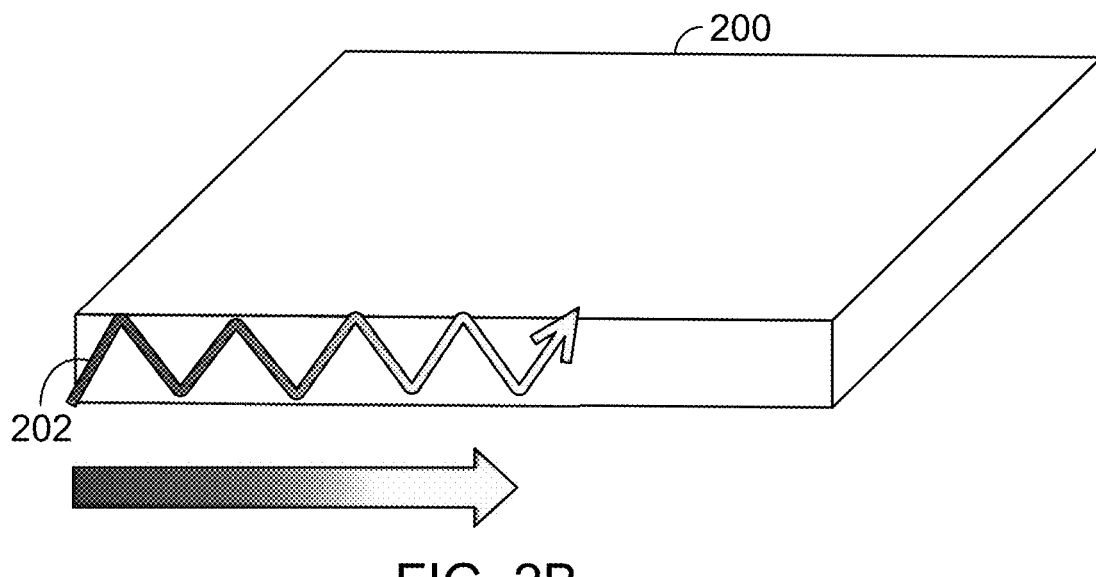

Typically, waveguide thicknesses described herein are on the order of a few hundred microns (about 200 μm to about 1000 μm) and are typically smaller than the total internal reflection (TIR) path lengths, which can be several centimeters (about 2 cm to about 15 cm). The longer optical path length in a waveguide facilitates effective absorption of the stray light even with low concentration dye loadings in a polymer waveguide. FIG. 2A depicts orange dye-doped waveguide 200 (e.g., with a thickness of about 200 μm to about 500 μm) and transmission of blue light 202 through orange-doped waveguide 200. FIG. 2B depicts attenuation of blue light 202 that occurs as the light travels a total internal reflection (TIR) path (e.g., about 3 cm to about 5 cm) through orange dye-doped waveguide 200. The suitability of a dye for dye loading into a specific polymer waveguide for color selectivity can depend at least in part on factors including chemical compatibility, process compatibility, and solubility of the dye in a base high index resin.

Color-selective waveguides described herein can be fabricated in a variety of methods, including various molding and casting methods, other appropriate methods including lithography methods (e.g., imprint lithography methods), etching methods, deposition methods, and any combination thereof. Fabrication may include a single process or two or more different processes. In one example, fabricating a color-selective waveguide includes casting a waveguide with a chromatic component to yield a doped waveguide (e.g., a dye-doped waveguide), and modifying the doped waveguide to include features (e.g., gratings, pillars, spacers, and the like). The doped waveguide may be flat or patterned, or have any combination of flat and patterned regions. Modifying the doped waveguide can include an imprint lithography process or an etching process to create appropriate features.

Figure 3A:
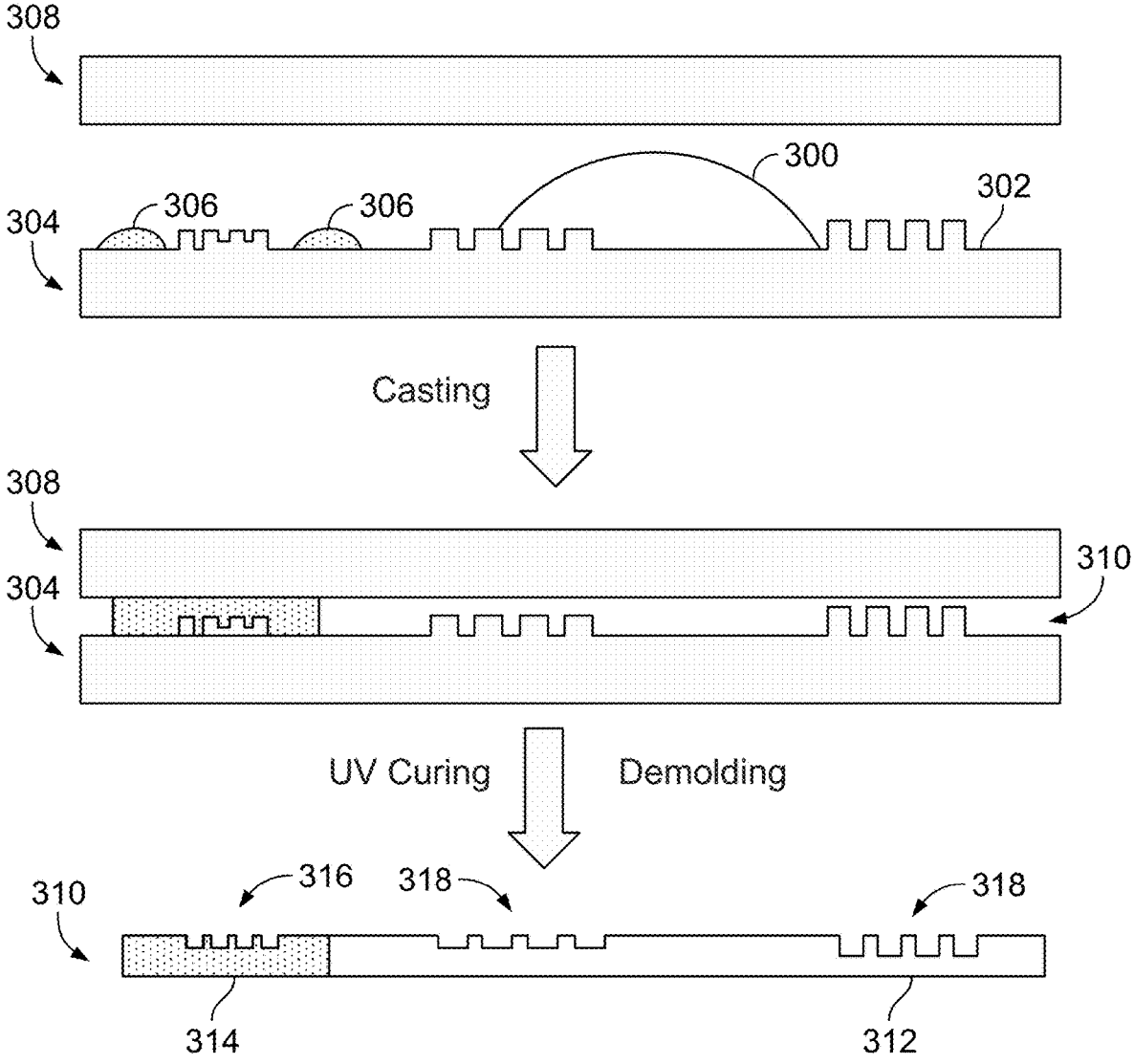
FIG. 3A depicts local dispense of dye-doped resin during waveguide fabrication via casting.
Figure 3B:
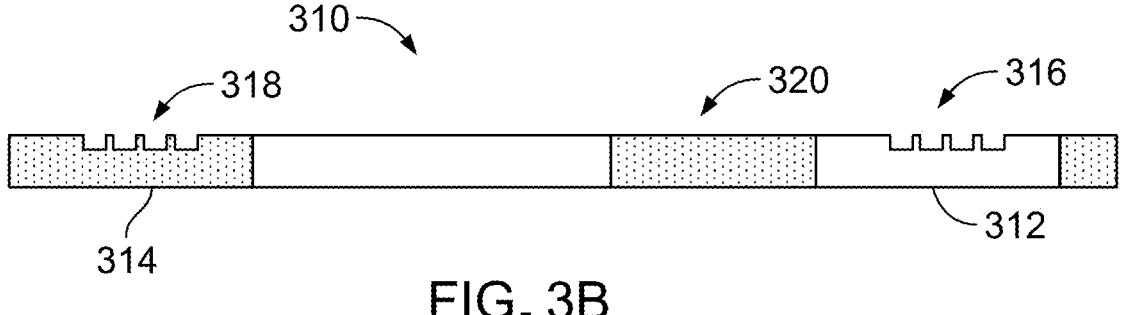
FIG. 3B depicts a dye-doped polymer waveguide.
Figure 3C:
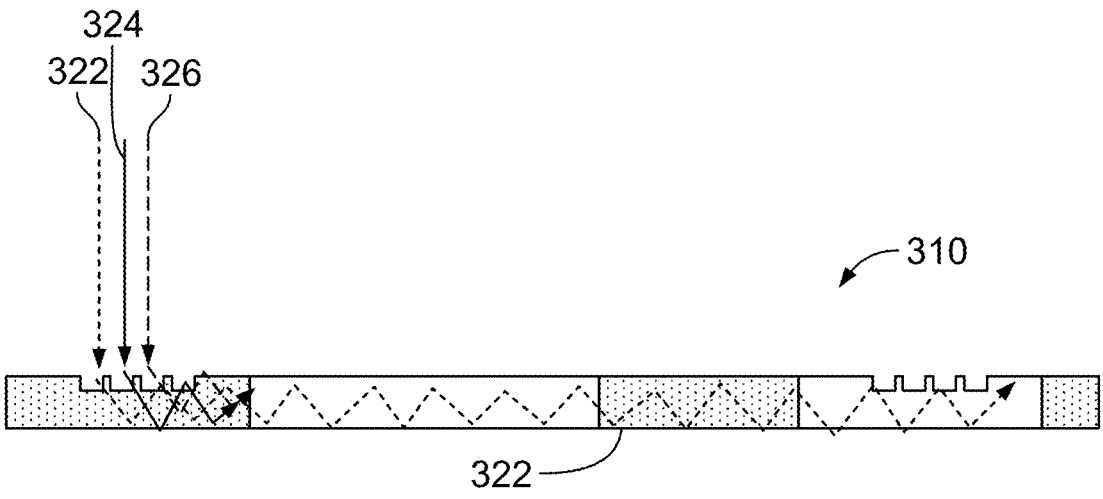
FIG. 3C depicts transmission of a selected light component through a dye-doped polymer waveguide.

One aspect includes local dispense of dye-doped high index resin along with dispense of a base resin for waveguide fabrication. Using this approach, the dye doping can be achieved at a single or multiple locations in the bulk of the polymer waveguide depending at least in part on the concentration of the dye used and or the extent of light that needs to be attenuated. In one example, the dye-doped high index resin is dispensed in a controlled fashion around the ICG area. FIG. 3A depicts steps in a process for fabricating a dye-doped polymer waveguide. Base (un-doped) high-index resin 300 is dispensed onto patterned surface 302 (e.g., around a center area) of bottom mold 304. Dye-doped resin 306 is dispensed onto another area of bottom mold 304 and allowed to spread between top mold 308 and bottom mold 304 spaced apart at a selected distance. After casting, the resins are cured (e.g., with UV radiation), and the resulting waveguide is demolded to yield dye-doped polymer waveguide 310 with un-doped polymer region 312 and doped polymer region 314. Dye-doped polymer waveguide 310, with ICG area 316 formed of doped polymer and diffractive areas 318 formed of un-doped polymer, is highly selective for a chosen color. As depicted in FIG. 3B, doped polymer waveguide 310 includes un-doped polymer regions 312 (diffractive areas 316) and doped polymer regions 314 (ICG area 318 and areas 320 between diffractive areas 316). FIG. 3C shows light with RGB components 322, 324, 326, respectively, entering dye-doped polymer waveguide 310, and only the selected component (e.g., red component 322) demonstrating TIR through dye-doped polymer waveguide 310.

Example 1. Two different resin samples were prepared based on LUMIPLUS 1.71 index resin supplied by Mitsubishi Gas Chemicals (MGC), Japan. 50 ml of pure LUMIPLUS formulation was prepared using MGC's protocol without adding any dye in the base resin to yield a resin batch. 25 ml of the resin batch was taken in a separate glass vial and 1 wt % of VIS 484 (supplied by Adam Gates & Company) was added to the vial. The resulting dye loaded resin was then subjected to ultrasonic waves for mixing for about 5 minutes to yield a homogeneous dye-doped resin. A polymer waveguide was fabricated by dispensing about 3 ml of pure resin in the center and about 1 ml of dye-doped resin around the ICG area onto a nano-patterned mold with diffractive patterns. The resin then spread between two molds spaced apart with a distance of about 350 μm and was exposed to UV light (wavelength of about 365 nm) for curing followed by a post anneal step at 100° C. for 20 minutes. The resulting dye-doped polymer waveguide has two different zones as depicted in FIG. 3A: a first zone around the ICG area that has a color selective dye, with the rest of the waveguide being free of dye.

In a manner similar to that described in Example 1, various color dyes (Red, Green, Blue, Cyan, Magenta, Yellow and Infrared dye) that have selective transmission and absorption can be used to fabricate color selective polymer waveguides. Example base resin/dye combinations are listed in Table 1.

TABLE 1

Various combinations of dyes and base resins for color selective polymer waveguides.

| Dye | Base Resin/monomer | Absorbing wavelength (nm) | Transmitting wavelength (nm) |
|---|---|---|---|
| VIS 484 from Adam Gates & Company | High refractive index resins (LUMIPLUS) 1.72 and 1.75 index resins (MGC Advanced Polymers, Inc.), UV curable low index polymers such as acrylates, thiol-ene polymers, polydimethoxysilane (PDMS), OrmoStamp (micro resist technology GmbH) | 420-550 Blue and Green | 600-900 Red |
| VIS 606 from Adam Gates & Company | High refractive index resins-LUMIPLUS 1.72 and 1.75 index resins (MGC Advanced Polymers, Inc.), UV curable low index polymers such as acrylates, thiol-ene polymers, polydimethoxysilane (PDMS), OrmoStamp (micro resist technology GmbH) | 530-650 Green and Red | 400-500 Blue |
| VIS 682 from Adam Gates & Company | High refractive index resins-LUMIPLUS 1.72 and 1.75 index resins from (MGC Advanced Polymers, Inc.), UV curable low index polymers such as acrylates, thiol-ene polymers, polydimethoxysilane (PDMS), OrmoStamp (micro resist technology GmbH) | 600-750 Red | 400-610 Blue & Green |

TABLE 1-continued

Various combinations of dyes and base resins for color selective polymer waveguides.

| Dye | Base Resin/monomer | Absorbing wavelength (nm) | Transmitting wavelength (nm) |
|---|---|---|---|
| SR-4000L from Fujifilm | High refractive index resins-LUMIPLUS 1.72 and 1.75 index resins from (MGC Advanced Polymers, Inc.), UV curable low index polymers such as acrylates, thiol-ene polymers, polydimethoxysilane (PDMS), OrmoStamp (micro resist technology GmbH) | 400-570 Blue and Green | 570-700 Red |
| SG-4000L from Fujifilm. | High refractive index resins-LUMIPLUS 1.72 and 1.75 index resins from (MGC Advanced Polymers, Inc.), UV curable low index polymers such as acrylates, thiol-ene polymers, polydimethoxysilane (PDMS), OrmoStamp (micro resist technology GmbH) | 400-475 & 600-700 Blue and Red | 500-575 Green |
| SB-4000L from Fuji-film | High refractive index resins-LUMIPLUS 1.72 and 1.75 index resins from (MGC Advanced Polymers, Inc.), UV curable low index polymers such as acrylates, thiol-ene polymers, polydimethoxysilane (PDMS), OrmoStamp (micro resist technology GmbH) | 525-700 Green and Red | 400-500 Blue |
| VIS 575 from Adam Gates & Company (Black dye) | High refractive index resins-LUMIPLUS 1.72 and 1.75 index resins from (MGC Advanced Polymers, Inc.), UV curable low index polymers such as acrylates, thiol-ene polymers, polydimethoxysilane (PDMS), OrmoStamp (micro resist technology GmbH) | 400-650 Most visible wavelengths | > 700 > Infrared |

In addition to the resin-dye combinations listed in Table 1, two or more dyes can be incorporated into the same base resin to achieve specific color selectivity. Examples of dye combinations are listed in Table 2. This approach can be helpful when a single dye cannot achieve the desired color selectivity. In one example, a pseudo black dye formulated to absorb RGB light is doped around an ICG toward the anti-launch side to absorb RGB light. Such pseudo black dye can also be applied around the periphery of a glass or polymer waveguide to absorb RGB light reflected or refracted from the edges.

TABLE 2

Combinations of dyes for desired color selectivity in polymer waveguides

| Color | Dye(s) | Location in a waveguide | Expected outcome |
|---|---|---|---|
| Red | Blue and green light absorbing dyes | Local or global | Block blue and green light; allow only red light |
| Green | Blue and red light absorbing dyes | Local or global | Block blue and red light; allow only green light. |
| Blue | Green and red light absorbing dyes | Local or global | Block green and red light; allow only green light to do TIR. |
| Pseudo Black (R + G + B) | Red, green, and blue light absorbing dyes | Local around ICG area (anti-launch side) | Block RGB light colors |
| Infrared | Infrared dye | Local or global | Helps with eye tracking |

Figure 4A:
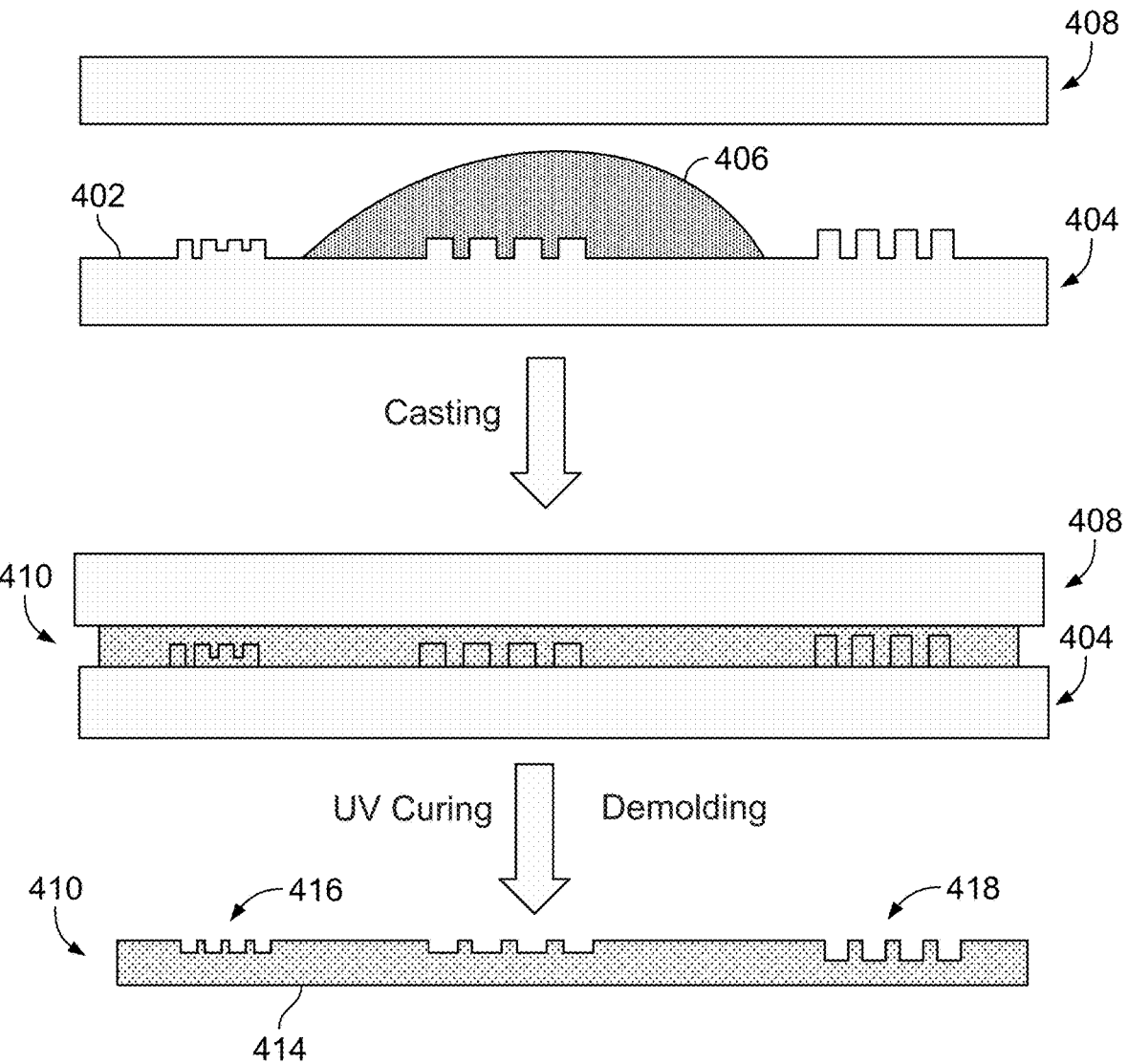
FIGS. 4A-4D depict global dispense of dye-doped resin to yield color-selective waveguides.
Figure 4B:
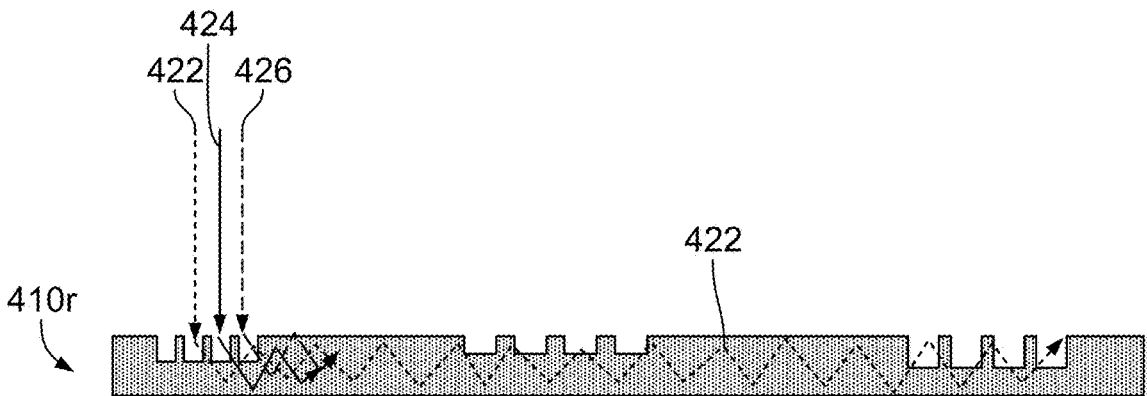
Figure 4C:
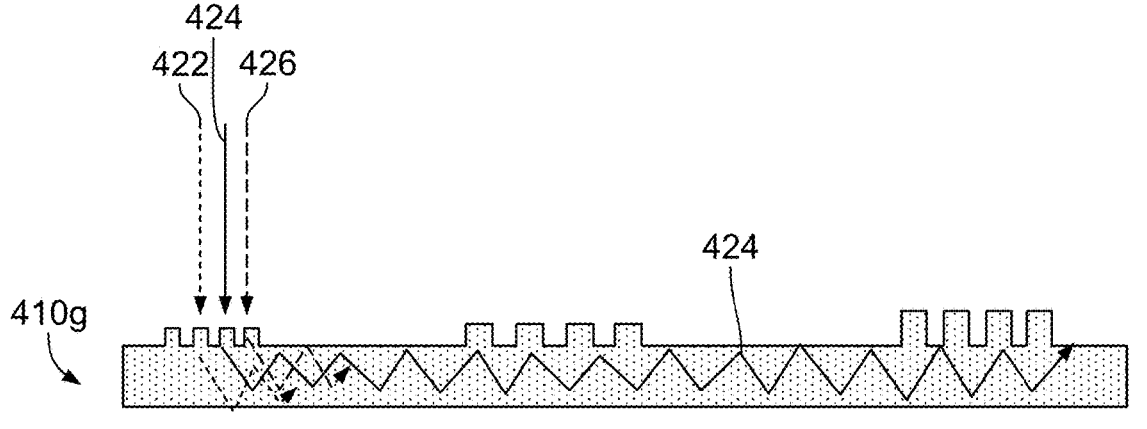
Figure 4D:
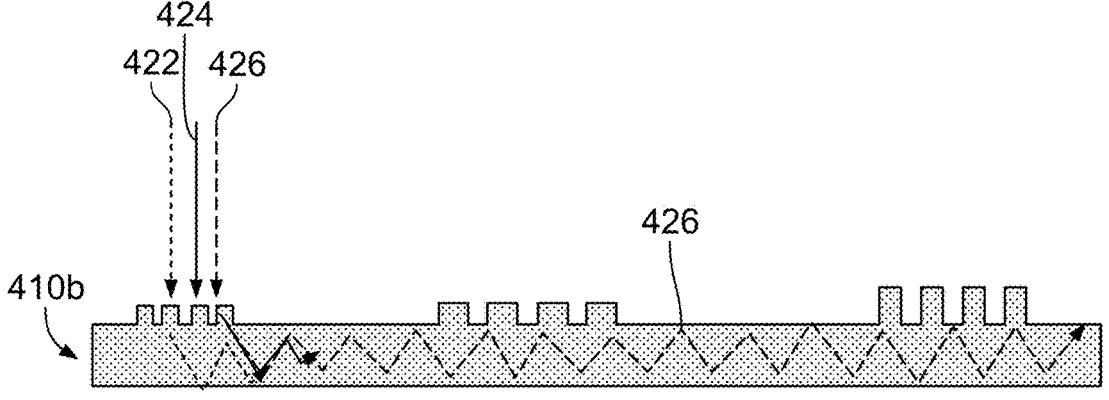

Another aspect includes global dispense of dye-doped high-index resin for waveguide fabrication. Since the waveguide is uniformly doped, a low concentration of the dye can effectively attenuate the unwanted light as the light undergoes TIR over a path length of a few centimeters. FIG. 4A depicts global dispense of dye-doped high-index resin, in which dye-doped resin 406 is dispensed on patterned surface 402 of bottom mold 404 and undergoes a casting and curing process between bottom mold 404 and top mold 408 similar to that depicted in FIG. 3A to fabricate color selective waveguide 410 with only dye-doped polymer 414 in ICG area 416 and diffractive areas 418. FIGS. 4B-4D depict ray diagrams for waveguides doped with dyes that allow only red, green, and blue light 422, 424, and 426, respectively. In FIG. 4B, red polymer-doped waveguide 410r allows TIR of only red light 422. In FIG. 4C, green polymer-doped waveguide 410g allows TIR of only green light 424. In FIG. 4D, blue polymer-doped waveguide 410b allows TIR of only blue light 426.

Example 2. 25 ml of LUMIPLUS 1.72 index resin was prepared in a glass vial per MGC's POR mix ratio of individual monomers. To this, a VIS484 dye from Adam Gates & Company was added in a low concentration. The resulting dye-doped resin was then subjected to ultrasonic waves for mixing for about 5 minutes to yield a homogeneous dye-doped resin. The dye-doped resin formulation was dispensed onto a mold surface for waveguide fabrication.

In a manner similar to that described in Example 2, various color dyes (Red, Green, Blue, Cyan, Magenta, Yellow, and Infrared) as shown in Table 1 that have selective transmission and absorption can be used to fabricate color-selective polymer waveguides.

Figures 5A, 5B, 5C:
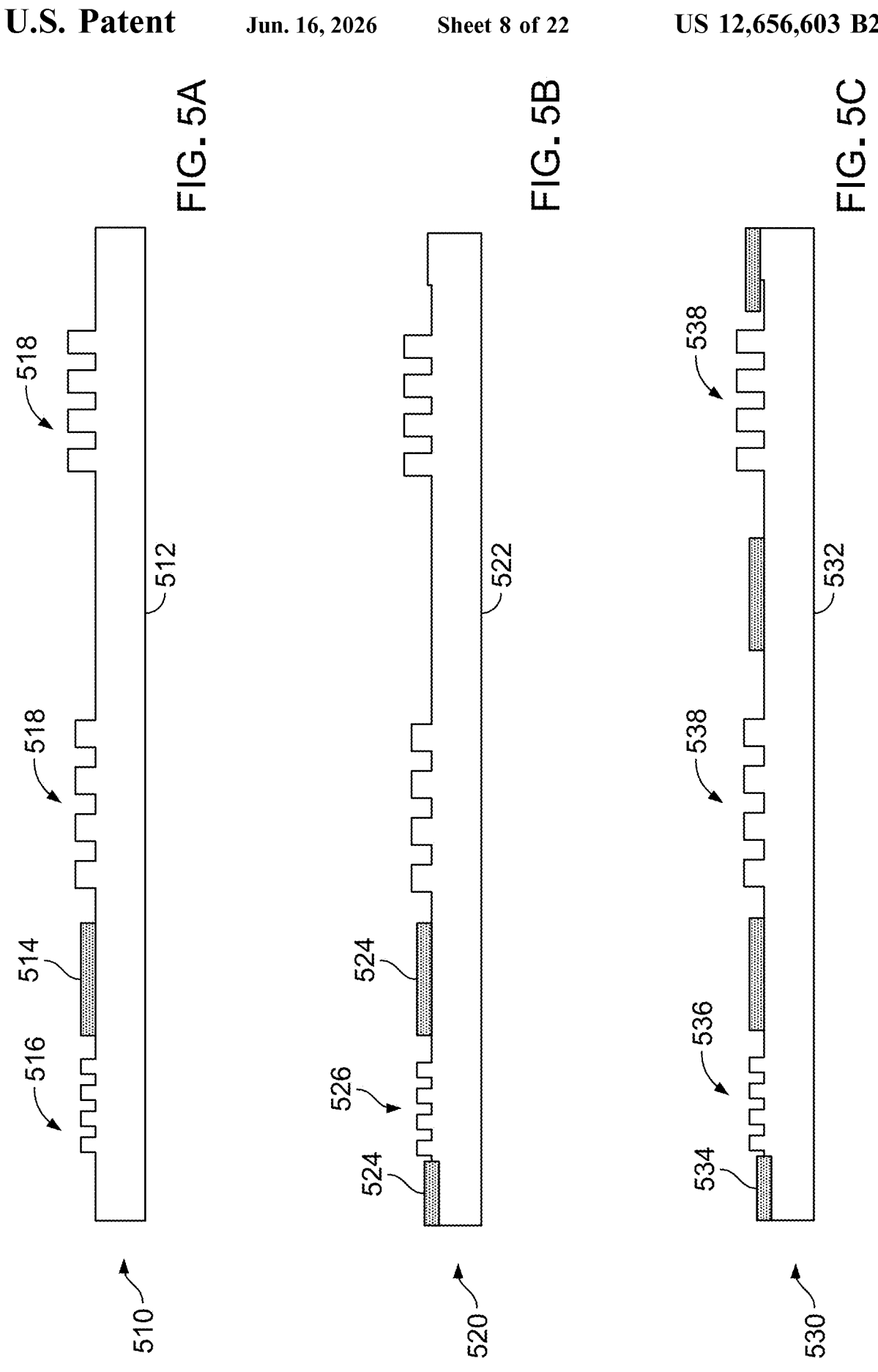

Another aspect includes local and global coating of the dye-doped high-index resin on a waveguide surface. The waveguide to be coated can be formed of glass or polymer. In this approach, a waveguide surface can be coated locally or globally with dye-doped high-index resin to achieve a desired light attenuation. FIGS. 5A-5F depict various implementations of such coatings and example locations on the waveguide where such coatings can be applied. In FIG. 5A, dye-doped polymer waveguide 510 includes waveguide 512 and dye-doped polymer coating 514 between ICG area 516 and diffractive areas 518. In FIG. 5B, dye-doped polymer waveguide 520 includes waveguide 522 and dye-doped coating 524 around ICG area 526. In FIG. 5C, dye-doped polymer waveguide 530 includes waveguide 532, dye-doped coating 534 around ICG area 536 and diffractive area 538. In FIG. 5D, dye-doped polymer waveguide 540 includes waveguide 542, first dye-doped coating 544 on a side of ICG area 546, as well as second dye-doped coating 544' on a surface of waveguide 542 opposite ICG area 546 and diffractive areas 548. Second dye-doped coating 544' can be the same as or different than (e.g., in one or more of thickness, color, composition, concentration, transmission) first dye-doped coating 544. In FIG. 5E, dye-doped polymer waveguide 550 includes waveguide 552, first dye-doped coating 554 on waveguide 552 surrounding ICG area 556, as well as second dye-doped coating 554' on a surface of waveguide 552 opposite ICG area 556 and diffractive areas 558. Second dye-doped coating 554' can be the same as or different than (e.g., in one or more of thickness, color, composition, concentration, transmission) first dye-doped coating 554, each of which can be the same or different (e.g., in one or more of thickness, color, composition, composition). In FIG. 5F, dye-doped polymer waveguide 560 includes waveguide 562, first dye-doped coating 564 around ICG area 566 and diffractive areas 568, as well as second dye-doped coating 564' on a surface of waveguide 562 opposite ICG area 566 and diffractive areas 568. Second dye-doped coating 564' can be the same as or different than (e.g., in one or more of thickness, color, composition, composition) first dye-doped coating 564, each of which can be the same or different (e.g., in one or more of thickness, color, composition, composition).

Referring to FIGS. 5A-5F, waveguides 512, 522, 532, 542, 552, and 562 can be glass or polymer. In locations where the dye-doped polymer might interfere with a user's vision, a low concentration of the dye can be used such that the color tint is not detectable. In locations where the dye-doped polymer will not interfere with a user's vision, a higher concentration dye can be introduced to achieve greater light attenuation as the light propagates with TIR through the waveguide, and thereby achieving higher color selectivity.

Figure 6A:
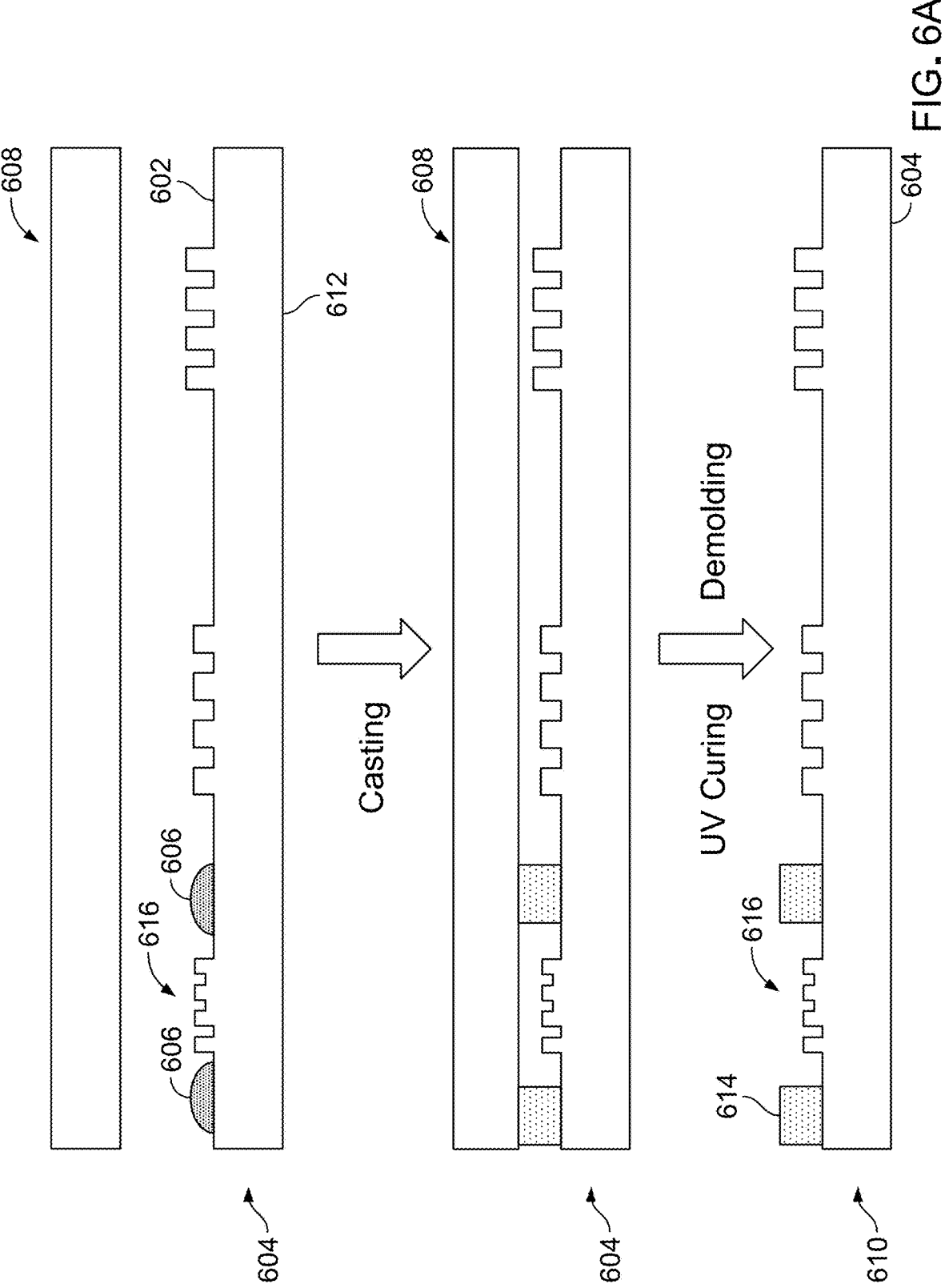
FIGS. 6A and 6B depict direct casting of a color filter onto a surface of an existing waveguide or cover layer.
Figure 6B:
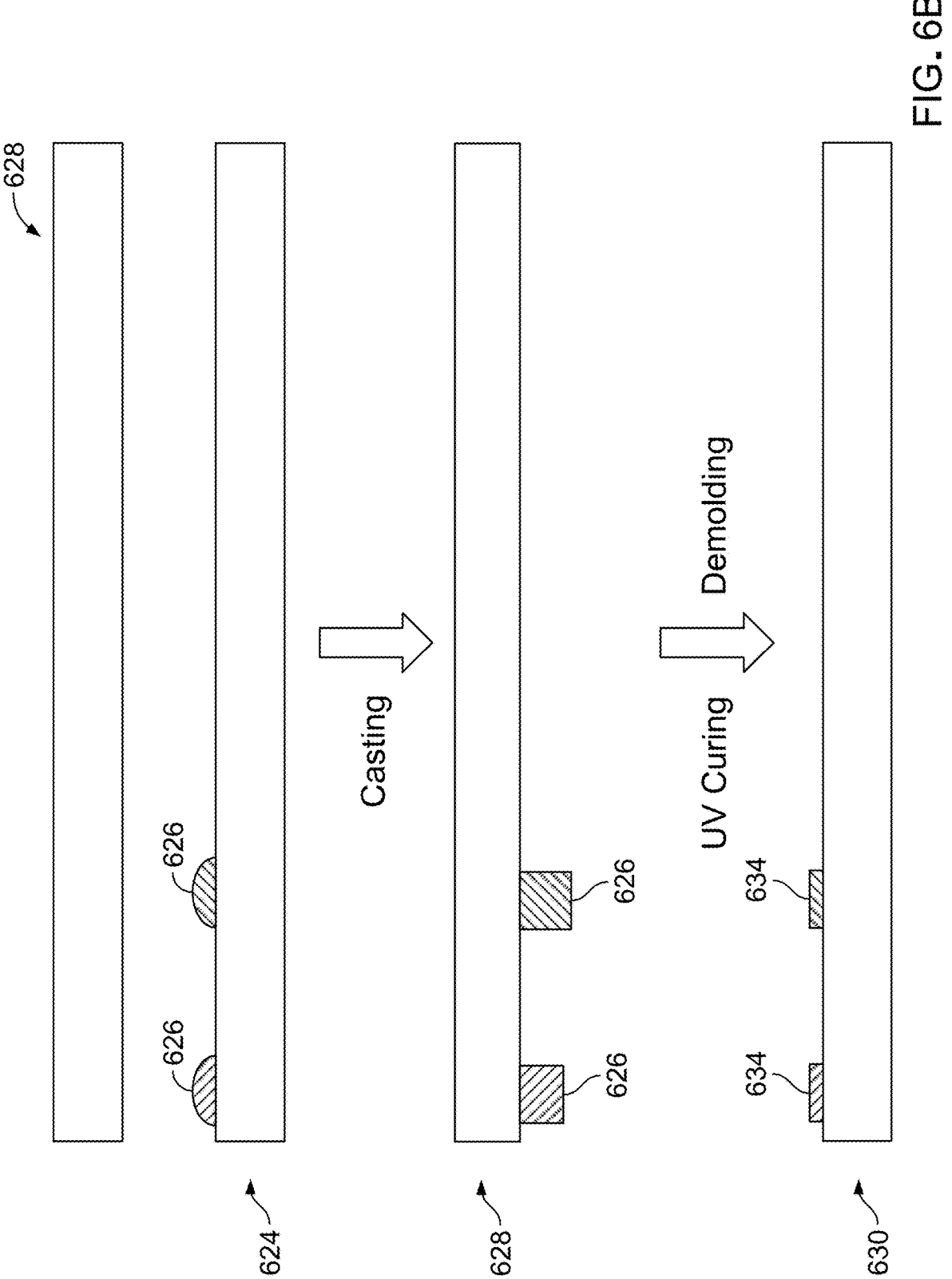

Another aspect includes casting a color filter directly onto a surface of a waveguide or a cover layer. In this approach, local high-pigmented areas of a specific dye are deposited onto a glass or polymer waveguide or cover layer surface using a UV curable composition loaded with desired dye pigments. FIGS. 6A and 6B illustrate color filter fabrication for a waveguide and a cover layer, respectively. FIG. 6A depicts casting of dye-doped resin 606 in ICG area 616 on patterned surface 602 between top mold 608 and substrate 604. Substrate 604 is waveguide 612 (e.g., a glass waveguide or a polymer waveguide). After casting and UV curing, dye-doped waveguide 610 includes dye-doped regions 614 around ICG area 616. FIG. 6B depicts casting of dye-doped resin 626 between substrate 624 (e.g., a cover glass or polymer layer) and top mold 628, followed by UV curing and demolding of doped polymer waveguide 630 with colored filters 634 on a surface of doped polymer waveguide 630. Dye-doped resins 626 may be the same or different (e.g., in thickness, color, composition, concentration, transmission), such that colored filters 634 are similarly the same or different.

Figure 7:
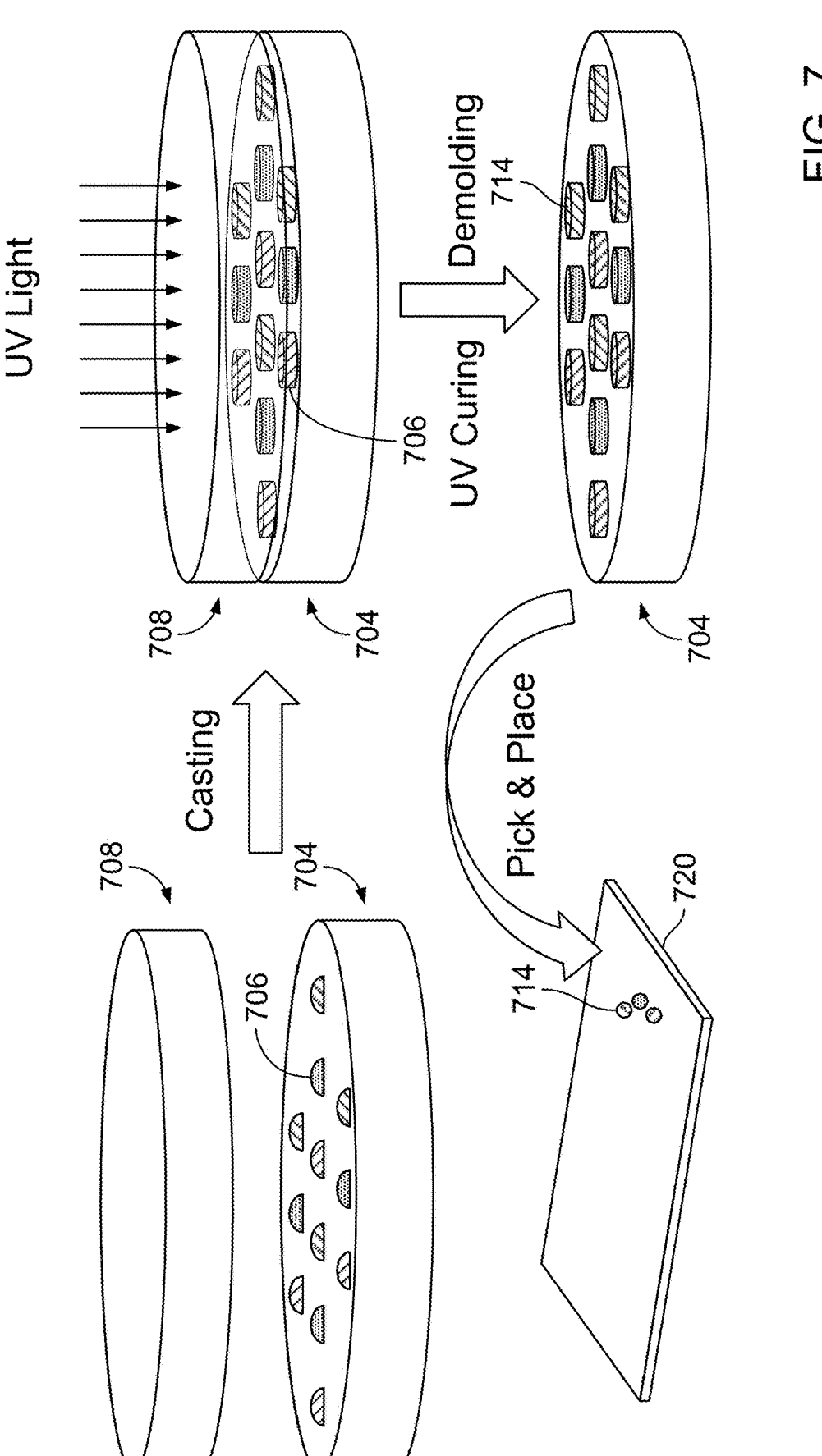
FIG. 7 depicts casting of individual color filters with a dye-doped resin.

Another aspect includes casting individual color filters separately. The resulting color filters can be fabricated separately in multiple numbers via casting of UV-curable dye-doped high-index resin, as depicted in FIG. 7. The color filters then can be picked and placed onto a polymer or glass substrate for use in a selected device. FIG. 7 depicts dye-doped resin on bottom mold 704, and casting of dye-doped resin 706 between bottom mold 704 and top mold 708. The dye-doped resins 716 can be different colors (e.g., RGB). Dye-doped resins 706 are cured (e.g., with UV light) and demolded to yield colored filters 714 on bottom mold 704. Colored filters 714 (e.g., one each of RGB) can be removed (picked) from bottom mold 704 and positioned (placed) on substrate 720 (e.g., a cover layer).

Another aspect includes doping polymer waveguides with infrared dye. Polymer waveguides doped with infrared dye can assist with eye tracking. A waveguide doped with infrared dye can be fabricated in a manner similar to that described in Example 1 or Example 2.

Another aspect includes doping polymer waveguides with one or more dyes having a selected concentration gradient. FIGS. 8A-8H depict a top view of various implementations in which a waveguide is doped with a dye having a selected concentration gradient over all or a portion of the waveguide to yield a dye-doped waveguide. Dye concentration, doping location, and gradient pattern can be selected based on the application. The dye-doped gradient can be achieved by dispensing dye-doped resin droplets with varying dye concentrations and spreading the droplets to cover the desired areas of the waveguide before curing the resin.

Figure 8:
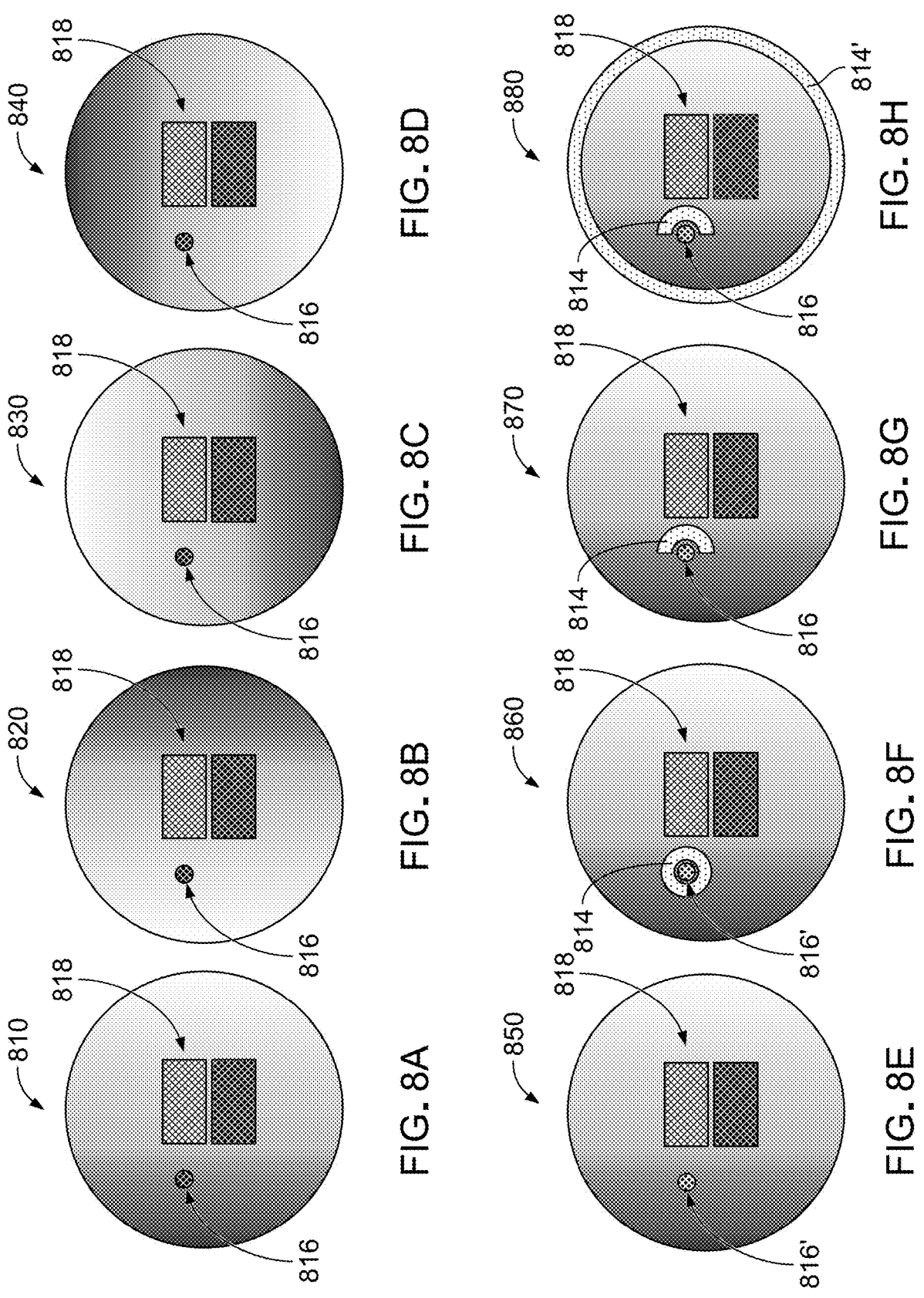
FIGS. 8A-8H depict examples of gradients in dye loadings in a waveguide.

FIG. 8A depicts dye-doped waveguide 810 with a dye concentration gradient decreasing from a perimeter of dye-doped waveguide 810 proximate ICG area 816 toward the perimeter of dye-doped waveguide 810 proximate diffraction (e.g., EPE/OPE) areas 818. FIG. 8B depicts dye-doped waveguide 820 with a dye concentration gradient increasing from a perimeter of dye-doped waveguide 820 proximate ICG area 816 toward the perimeter of dye-doped waveguide 820 proximate diffraction areas 818. FIG. 8C depicts dye-doped waveguide 830 with a dye concentration gradient increasing from perimeter proximate a first side of both the ICG area 816 and diffraction areas 818 (e.g., closer to ICG area 816) toward the perimeter on a second side of ICG area 816 and diffraction areas 818 (e.g., closer to diffraction areas 818). FIG. 8D depicts dye-doped waveguide 840 with a dye concentration gradient increasing from a perimeter of dye-doped waveguide 840 proximate the second side of ICG area 816 and diffraction areas 818 (e.g., closer to diffraction areas 818) toward the perimeter on the first side of ICG area 816 and diffraction areas 818 (e.g., closer to diffraction areas 818). FIG. 8E depicts dye-doped waveguide 850 having a dye concentration gradient similar to that of dye-doped waveguide 810 in FIG. 8A, together with a dye-doped ICG area 816'. Dye-doped ICG area 816' can include a dye the same as or different than (e.g., thickness, color, composition, concentration, transmission) the dye in the dye concentration gradient. FIG. 8F depicts dye-doped waveguide 860 similar to that of dye-doped waveguide 850 in FIG. 8E, together with dye-doped polymer 814 encircling ICG area 816. Dye-doped polymer 814 can include a dye the same as or different than (e.g., thickness, color, composition, concentration, transmission) the dye in the dye concentration gradient, ICG region 816, or both. FIG. 8G depicts dye-doped waveguide 870 similar to that of dye-doped waveguide 850 in FIG. 8E, together with dye-doped polymer 814 partially encircling ICG area 816. One of the diffraction areas 818 (e.g., EPE or OPE) is doped with a dye that is the same as or different than (e.g., thickness, color, composition, concentration, transmission) the dye in dye-doped polymer 814 partially encircling ICG region 816. Dye-doped polymer 814 is doped with a dye that is the same as or different than (e.g., thickness, color, composition, concentration, transmission) any other dye in dye-doped waveguide 870 (e.g., dye in the dye concentration gradient, dye in ICG area 816, or both). FIG. 8H depicts dye-doped waveguide 880 similar to that of dye-doped waveguide 870 in FIG. 8G, together with dye-doped region 814' about a perimeter of dye-doped waveguide 880. Dye-doped region 814' is doped with a dye that is the same as or different than (e.g., thickness, color, composition, concentration, transmission) one or more of the dye in the dye concentration gradient, the ICG area 816, and the diffraction area 818.

In some aspects, the dye-doped polymer of a polymer waveguide has a refractive index that is substantially the same as, or within a selected range ($\Delta n \leq 0.5$) of, the refractive index of an un-doped polymer of the polymer waveguide. Thus, in some implementations, dye-doped polymer in a polymer waveguide is formed from the same resin as an undoped polymer in the polymer waveguide. In certain implementations (e.g., for a glass waveguide), the refractive index of a dye-doped polymer coating may be selected to be substantially the same as the refractive index of the coated substrate (e.g., a glass substrate).

Table 3 lists optical and chemical properties (e.g., solubility, concentration, relative transmission) of suitable chromatic components for doped polymer waveguides and coatings, including components for red, blue, and green layer dyes.

Table 4 lists suitable ranges related to doping of chromatic components in high R.I. resins used for polymer waveguides.

TABLE 4

Absorption and Transmission bands,
absorptivity, and solubility for RGB polymer waveguides.

| Color | Absorption Band (nm) Absorptivity $(Lg^{-1} cm^{-1})$ | Transmission Band (nm) Absorptivity $(Lg^{-1} cm^{-1})$ | Solubility with no particulates |
|---|---|---|---|
| Red | 400-560 >10 | 600-650 <0.1 | >3 ppm |
| Green | 440-480, 600-650 >10 | 500-550 nm <0.1 | >3 ppm |
| Blue | 500-700 nm >10 | 440-480 <0.1 | >3 ppm |

Figure 9:
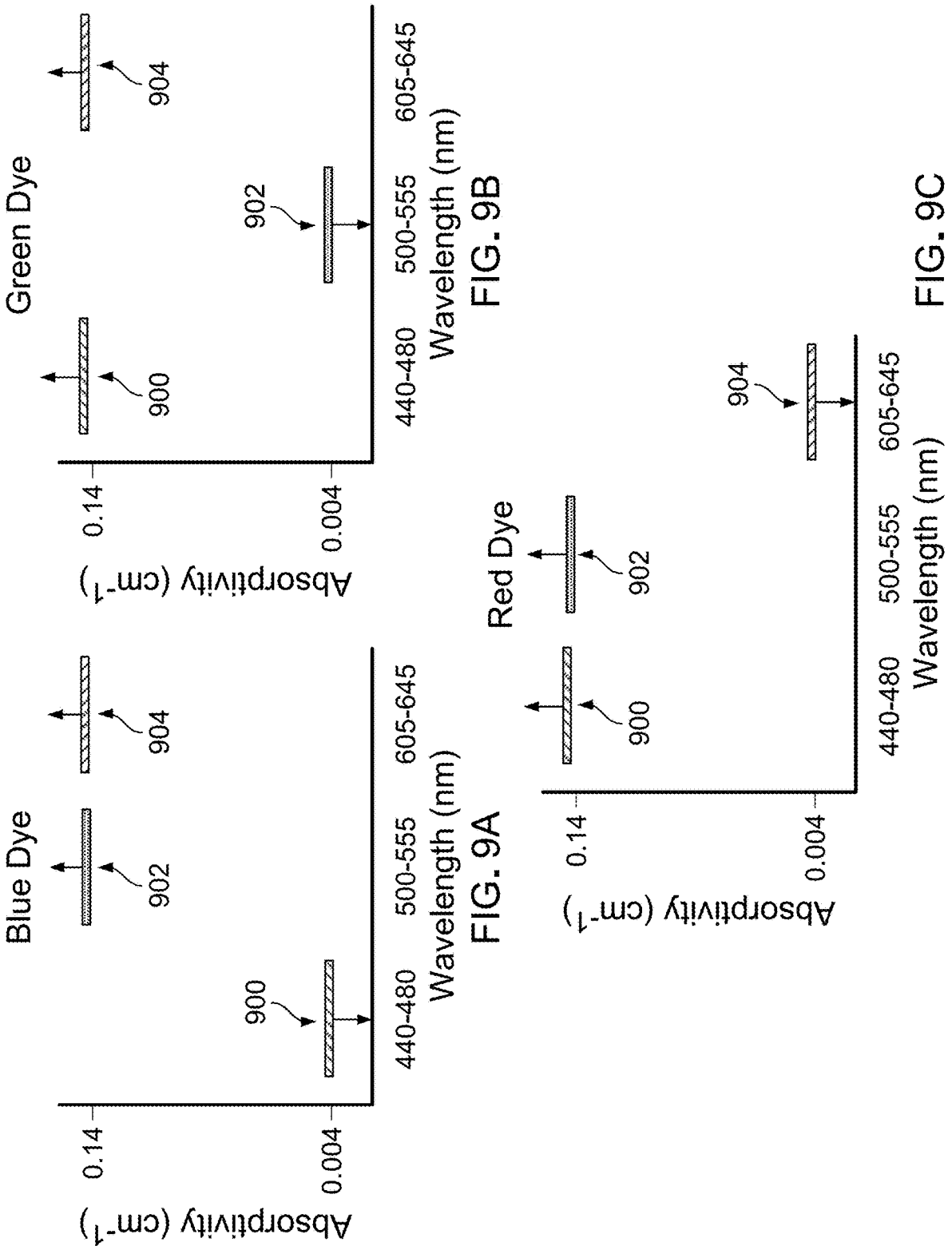
FIGS. 9A-9C show examples of suitable absorptivity ranges for red, green, blue (RGB) dyes for color-selective polymer waveguides.

Assuming that diffraction efficiency from LCOS is 60:1, and that all of this light is incident upon an ICG of a color other than the color of interest, it is estimated that >5:1 (<20% transmission) color filter performance is needed to achieve >300:1 performance. Using an estimated average path length in the waveguide of 50 mm, this equates to an absorptivity of $\geq 0.14$ cm$^{-1}$. For the color of interest, a transmission of >95% is advantageous. Using an estimated average path length in the waveguide of 50 mm, this equates to an absorptivity of $\leq 0.004$ cm$^{-1}$. FIGS. 9A-9C show examples of suitable absorptivity ranges for RGB dye wavelength ranges for color-selective polymer waveguides. In FIG. 9A (blue dye), the absorptivity for blue dye 900 is typically about 0.004 cm$^{-1}$ or less, and the absorptivity for

TABLE 3

Properties of suitable chromatic components for doped polymer waveguides and coatings.

| Material | Category | Number | Parameter Name | Specification |
|---|---|---|---|---|
| Blue Layer Dye | Optical | OP01 | Relative Transmission @ 455 nm | >60% |
| Blue Layer Dye | Optical | OP02 | Relative Transmission @ 511 nm-640 nm | <10% |
| Blue Layer Dye | Optical | OP03 | Relative Transmission @ 630 nm | <2% |
| Blue Layer Dye | Optical | OP04 | Relative Transmission @ 511 nm-700 nm | <55% |
| Green Layer Dye | Optical | OP05 | Relative Transmission @ 400 nm-464 nm | <10% |
| Green Layer Dye | Optical | OP06 | Relative Transmission @ 525 nm | >85% |
| Green Layer Dye | Optical | OP07 | Relative Transmission @ 621 nm-680 nm | <10% |
| Green Layer Dye | Optical | OP08 | Relative Transmission @ 621 nm-700 nm | <16% |
| Red Layer Dye | Optical | OP09 | Relative Transmission @ 400 nm-576 nm | <12% |
| Red Layer Dye | Optical | OP10 | Relative Transmission @ 450 nm-576 nm | <10% |
| Red Layer Dye | Optical | OP11 | Relative Transmission @ 620 nm-640 nm | AVG >90% |
| All Dye | Chemical | CH01 | Solubility in Acetone | Initial screening conditions: 0.03 g in 2 ml (room temperature, 3-4 min ultrasonic) |
| All Dye | Chemical | CH02 | Solubility in IPA | Initial screening conditions: 0.03 g in 2 ml (room temperature, 3-4 min ultrasonic) |
| All Dye | Chemical | CH03 | Solubility in Hexane | No requirement |
| All Dye | Chemical | CH04 | Solubility in Water | No requirement |
| All Dye | Chemical | CH05 | Concentration in High Index Resin | up to 3000 ppm | green dye 902 and red dye 904 is typically about 0.14 cm$^{-1}$ or greater. In FIG. 9B (green dye), the absorptivity for green dye 902 is typically about 0.004 cm$^{-1}$ or less, and the absorptivity for blue dye 900 and red dye 904 is typically about 0.14 cm$^{-1}$ or greater. In FIG. 9C (red dye), the absorptivity for red dye 904 is typically about 0.004 cm$^{-1}$ or less, and the absorptivity for blue dye 900 and green dye 902 is typically about 0.14 cm$^{-1}$ or greater.

While a final concentration of a colorimetric component at casting may correspond to the levels depicted in FIGS. 9A-9C, these ranges would correspond to <72% transmission (absorbing regions) and >99% transmission (transmission regions) for a 1 cm path length. It may be advantageous to consider an absorbance range between >0.7 and <0.02 at a 1 cm path length, which corresponds to <20% transmission (absorbing region) and >95% transmission (transmission regions).

Figure 10:
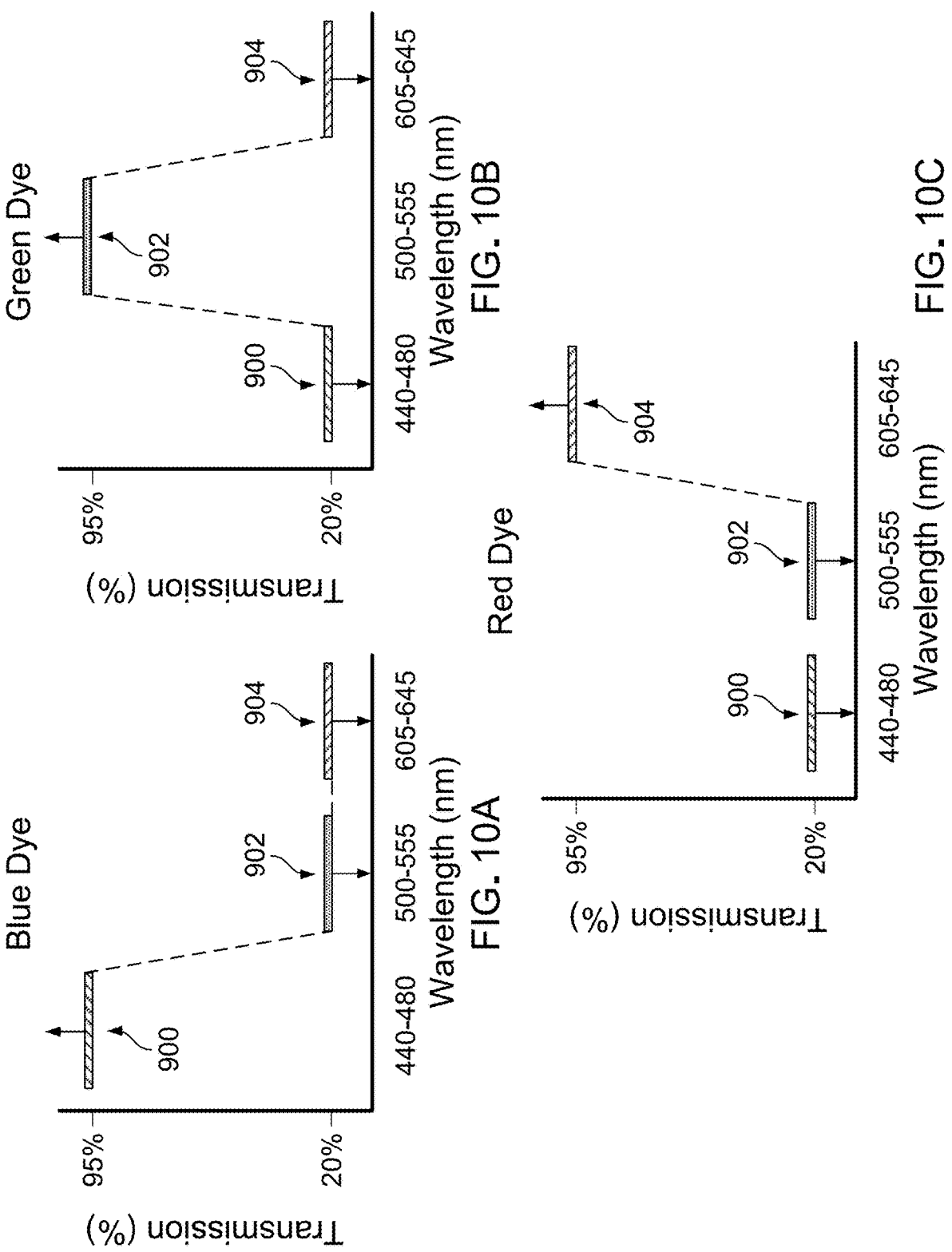
FIGS. 10A-10C shows examples of suitable transmission for red, green, and blue dyes for color-selective polymer waveguides.

FIGS. 10A-10C show examples of suitable transmission for RGB dyes for color-selective polymer waveguides. In FIG. 10A (blue dye), the transmission for blue dye 900 is typically about 95% or greater, and the transmission for green dye 902 and red dye 904 is typically about 20% or less. In FIG. 10B (green dye), the absorptivity for green dye 902 is typically about 95% or greater, and the transmission for blue dye 900 and red dye 904 is typically about 20% or less. In FIG. 9C (red dye), the transmission for red dye 904 is typically about 95% or greater, and the absorptivity for blue dye 900 and green dye 902 is typically about 20% or less.

In another aspect, colorant-doped (e.g., dye- or pigment-doped) UV-curable adhesives are implemented to retain light-absorbing or light-attenuating properties of an edge seal adhesive or interlayer adhesive, thereby allowing for efficient UV curing at a wide range of applied thicknesses. UV-cured adhesives are typically used for interlayer adhesive and edge seal applications, but if excessive UV light is absorbed at the adhesive surface during UV curing, a UV-cured skin and un-cured center can result. This imposes a thickness limitation on the applied adhesive, increasing processing time (cycles) in order to achieve increased thickness or limiting maximum thickness of the applied adhesive if the processing time is held constant. This effect is even more apparent for "black-edging adhesives," which typically include carbon black and broadly absorb UV-Visible light.

Figure 11:
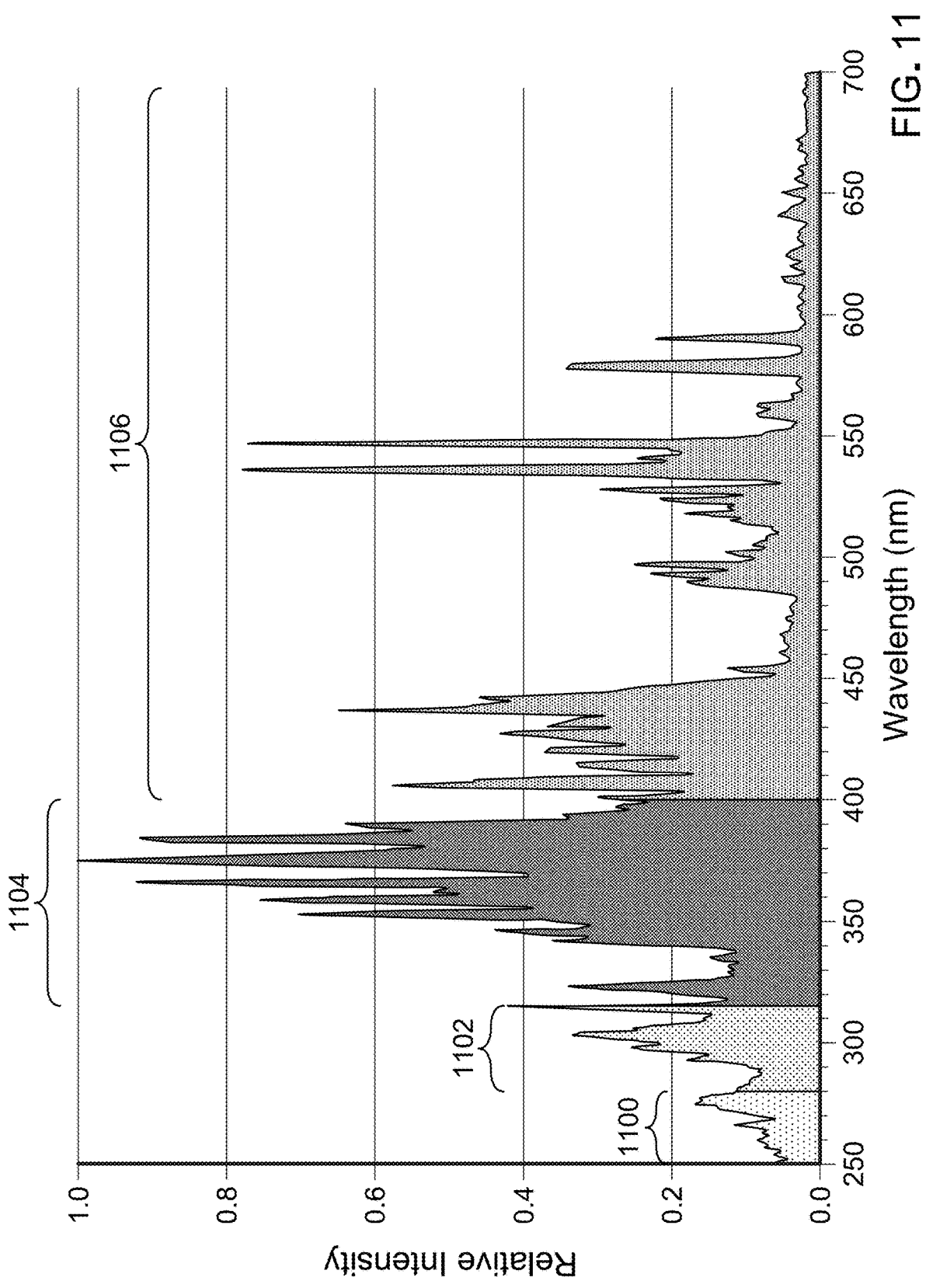
FIG. 11 shows the UV-visible spectrum of an example UVA enhanced lamp suitable for UV curing of adhesives.

FIG. 11 shows the UV-visible (200-400 nm 400-700 nm, respectively) spectrum of an example UVA enhanced lamp (Uvitron 600 W UVA Enhanced Lamp Spectral Distribution UV0834) suitable for UV curing of adhesives. The relative intensity of UVC radiation (200 nm to 280 nm-depicted as 250 nm to 280 nm) 1100, UVB radiation (280 nm to 315 nm) 1102, UVA radiation (315 nm to 400 nm) 1104, and visible radiation (400 nm to 700 nm) 1106. Carbon black absorption spectra have a broad absorption across UV and visible wavelengths. This broad absorption, especially in the UV, decreases the depth of cure of a black edging adhesive, and the UV radiation typically only penetrates to a limited depth of the layer (e.g., 120 μm to 200 μm), leaving the rest of the layer partially cured or completely uncured in the absence of thermal curing. When an edge seal is partially un-cured, the adhesive can phase separate during reliability test conditions, with clear resin wicking into the grating areas. While repeated application of thinner coatings followed by UV-curing after each coating can be implemented to achieve thicker coatings, adhesive dispensing uniformity and increased processing times (cycles) can be problematic.

Colorant-doped adhesives described herein are suitable for high-throughput manufacturing of waveguide based eye-pieces including polymer or glass waveguides. The absorption spectra of these color-absorbing adhesives can be selectively tuned (RGB, CMYK, etc.) to match the color channel and visible light absorption specifications of each waveguide. Colorants (e.g., pigments or dyes) with tailored spectra can be added to an adhesive to absorb the specific operating single or multiple wavelengths of light of the waveguides while not absorbing UV light, thereby allowing for efficient curing of the adhesive material with limited effect of its thickness. This method allows for fabrication of a customized wavelength-absorbing adhesive.

Colorant-doped adhesives are prepared by combining a base adhesive and a colorant. As provided by the Beer-Lambert law, concentration of the colorant in the base adhesive can be selected based on the absorptivity of the colorant at the wavelength of interest, the amount of light to be attenuated, and the optical path-length available to achieve this attenuation. The colorant can be selected to absorb the specific wavelength(s) carried by waveguide while not absorbing UV light. Suitable colorant concentrations are typically in a range of 0.1 mg/L to 100 g/L. Table 5 lists examples of commercially available UV curable adhesive materials, and Table 6 lists examples of commercially available colorants.

TABLE 5

| Examples of UV-curable adhesives | | |
| --- | --- | --- |
| Manufacturer | Product Name | Viscosity (cP) |
| ThreeBond | TB3042B | 500 cP |
| ThreeBond | TB3114 | 26,000 cP |
| Dexerials | SA1641SN | 35,000 cP |
| Dexerials | SA1801SN | 33,000 cP |
| Dymax | 3069 | 450 cP |
| Dymax | 4-20418-GEL | 35,000 cP |
| Dymax | 6-630-T | 6,000 cP |
| Dymax | OP-4-20632-GEL | 70,000 cP |

TABLE 6

| Examples of colorants | |
| --- | --- |
| Dye | Absorbing wavelength (nm) |
| VIS 484 | 420-550 |
| Adam Gates & Company | Blue and Green |
| VIS 606 | 530-650 |
| Adam Gates & Company | Red and Green |
| VIS 682 | 600-750 |
| Adam Gates & Company | Red |
| VIS461B | 400-500 |
| QCR Solutions Corp | Blue |
| VIS548B | 450-600 |
| QCR Solutions Corp | Green |
| VIS637A | 500-700 |
| QCR Solutions Corp | Red and Green |

In one example, a green light source with FWHM between 1 nm and 35 nm is paired with a colorant that absorbs in the same wavelength range. For certain architectures and light sources, a 1:1 match in spectra is favorable. For other architectures and light sources, the colorant absorption spectrum is focused on the peak wavelength of light source.

In a single color absorption example, a red channel waveguide is paired with an adhesive doped with red-absorbing colorant used as an edge absorber. FIGS. 12A-12C show RGB edge absorbers with colorant absorption spectra tailored directly to the color channel carried in the waveguide. The waveguide can be made of glass or polymer. FIG. 12A shows blue channel waveguide 1200 with spacer 1202 having adhesive 1204 doped with UV-pass blue-absorbing colorant (e.g., VIS461B). FIG. 12B shows green channel waveguide 1210 with spacer 1212 having adhesive 1214 doped with UV-pass green-absorbing colorant (e.g., VIS548B). FIG. 12C shows red channel waveguide 1220 having spacer 1222 having adhesive 1224 doped with UV-pass red-absorbing colorant (e.g., VIS637A).

In a multi-color absorption example, a blue and green channel waveguide is paired with an adhesive doped with blue and green wavelength absorbing colorant used as an edge absorber. The blue and green channel waveguide can be made of glass or polymer. FIG. 13 depicts blue and green channel waveguide 1300 with spacer 1302 having adhesive 1304 doped with UV-pass blue- and green-absorbing colorant (e.g., Adam Gates VIS484 or QCR Solutions VIS461B+QCR Solutions VIS548B).

Figure 14A:
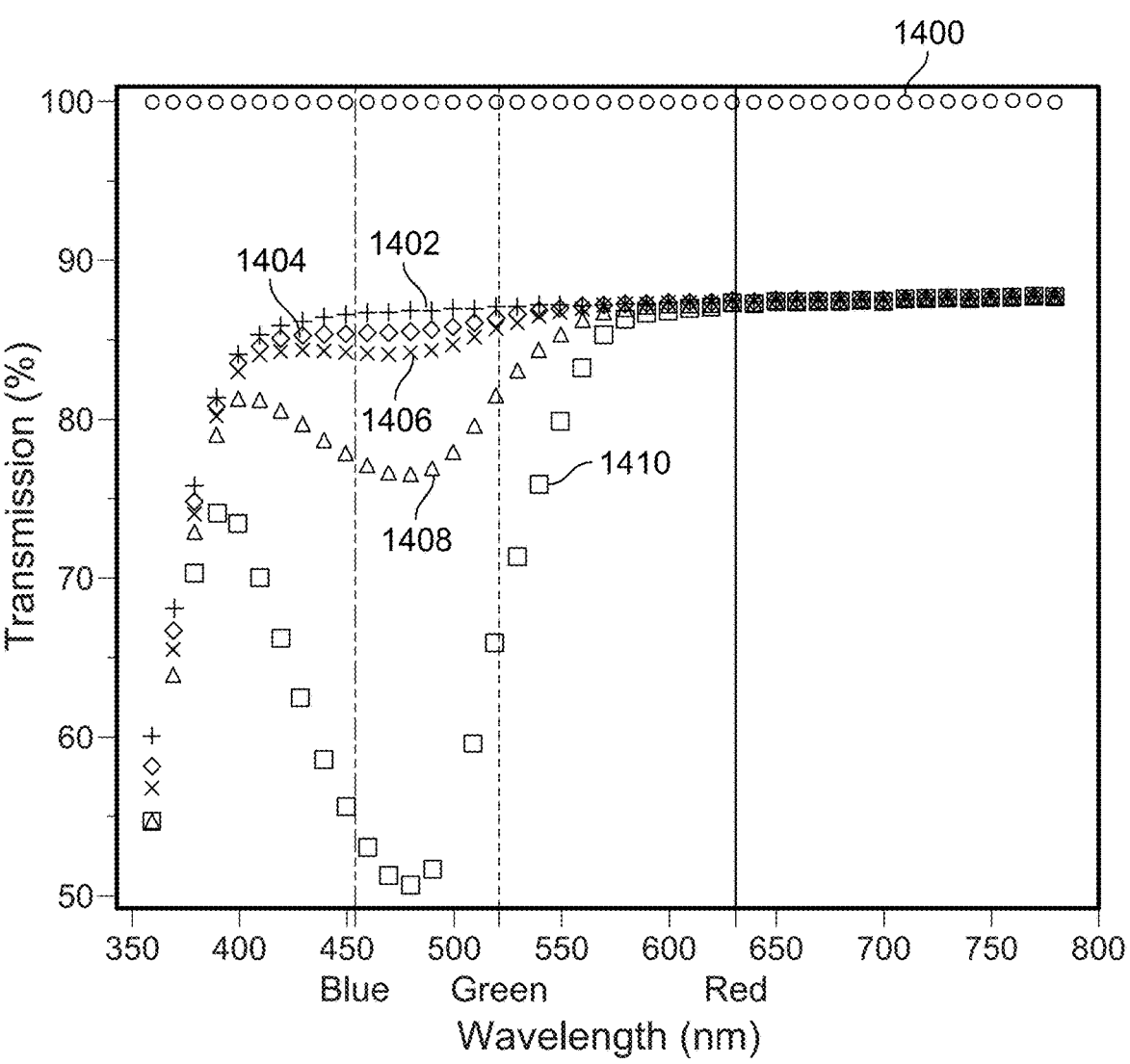
FIG. 14A shows an example with adhesive and a colorant having tailored absorption in green and blue wavelengths at different dopant levels.
Figure 14B:
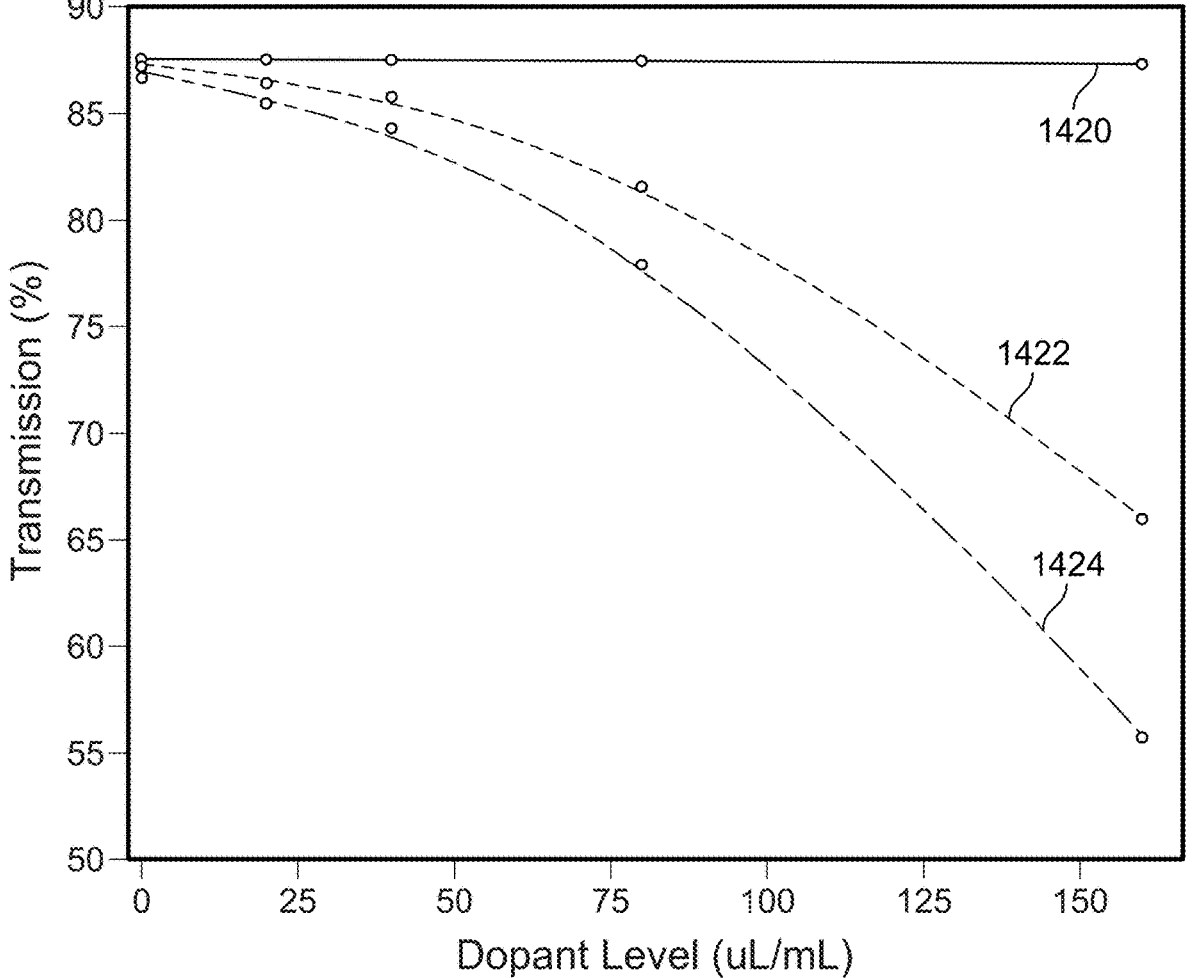
FIG. 14B is a graph showing percent transmission versus dopant level from FIG. 14A.

FIG. 14A shows transmission (%) versus wavelength (nm) of various compositions, including air (plot 1400), a comparative example with adhesive (LPB-224) only (plot 1402), and examples including adhesive (LPB-224) and various colorant (Adam Gates VIS484) concentrations (plots 1404, 1406, 1408, 1410) showing tailored absorption in blue and green wavelengths. Plot 1404 corresponds to 1 mL LPB-224/20 µL dye standard. Plot 1406 corresponds to 1 mL LPB-224/40 µL dye standard. Plot 1408 corresponds to 1 mL LPB-224/80 µL dye standard. Plot 1410 corresponds to 1 mL LPB-224/160 µL dye standard. The dye standard included 0.0177 g of VIS484 dissolved in 20.58 g (or 20.58 mL) base monomer (LPB). Plots 1420, 1422, 1424 in FIG. 14B show percent transmission (% T) versus dopant level at 640 nm, 520 nm, and 450 nm, respectively, taken from FIG. 14A.

Figure 15:
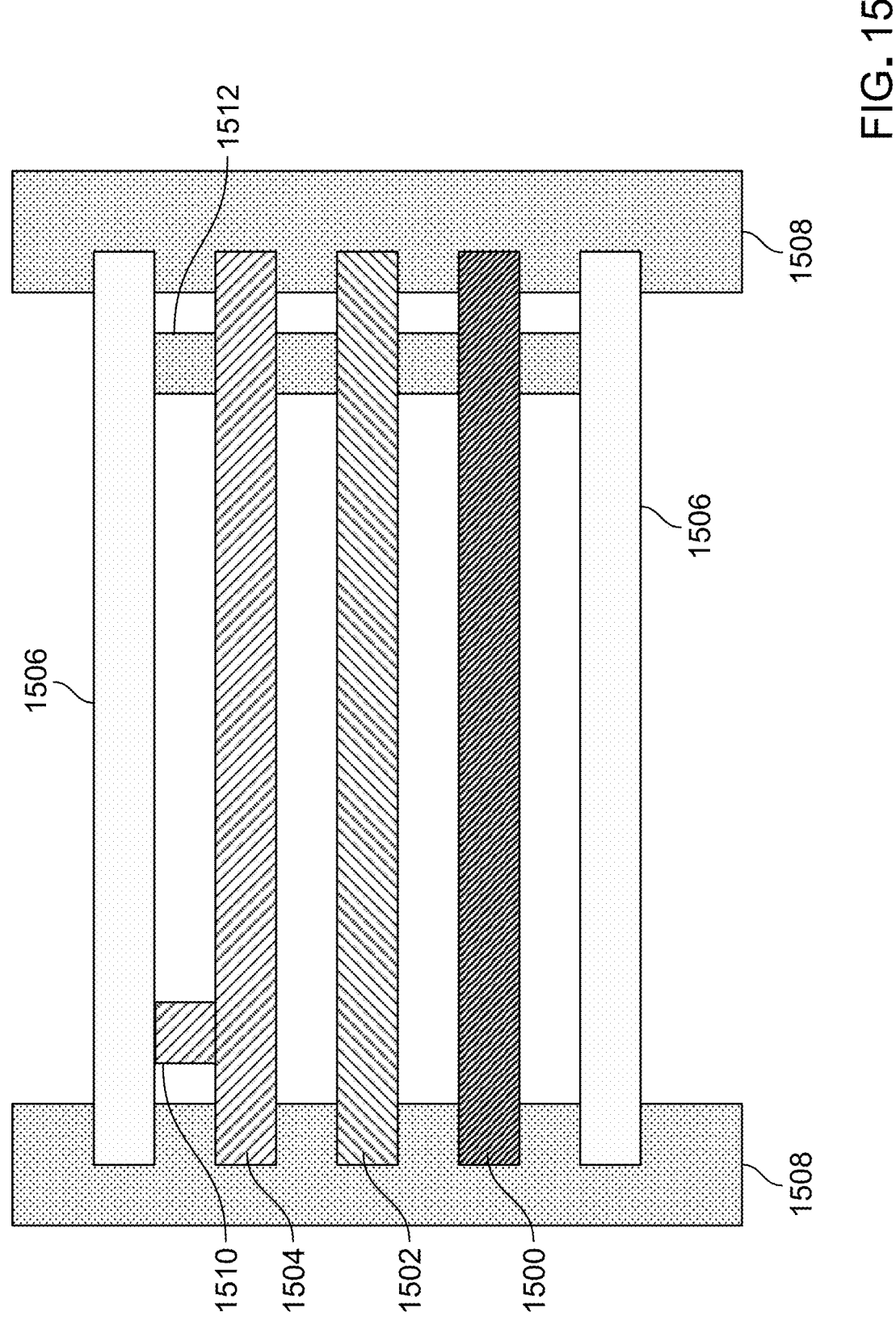
FIG. 15 depicts a visible wavelength edge absorber and interlayer lamination adhesive including colorants that absorb wavelengths of every color channel in the eyepiece stack.

In another example, a visible wavelength edge absorber and interlayer lamination adhesive is prepared by adding colorants that absorb wavelengths of every color channel in the eyepiece stack. FIG. 15 shows red, green, and blue channel waveguides 1500, 1502, 1504 between cover layers 1506 and supported by visible wavelength edge absorbers 1508 and integrated spacers 1510 and 1512. Waveguides 1500, 1502, and 1504 can be made of polymer or glass. Visible wavelength edge absorbers 1508 are RGB absorbing, UV-pass. Integrated spacers 1510 and 1512 include visible wavelength inter-lamination glue that is RGB absorbing, UV pass. Any mixture of RGB, CMY, or the like can be used, depending on the wavelength(s) of waveguide channel light that are advantageously absorbed, while leaving the adhesive with UV-transparency.

Figure 16:
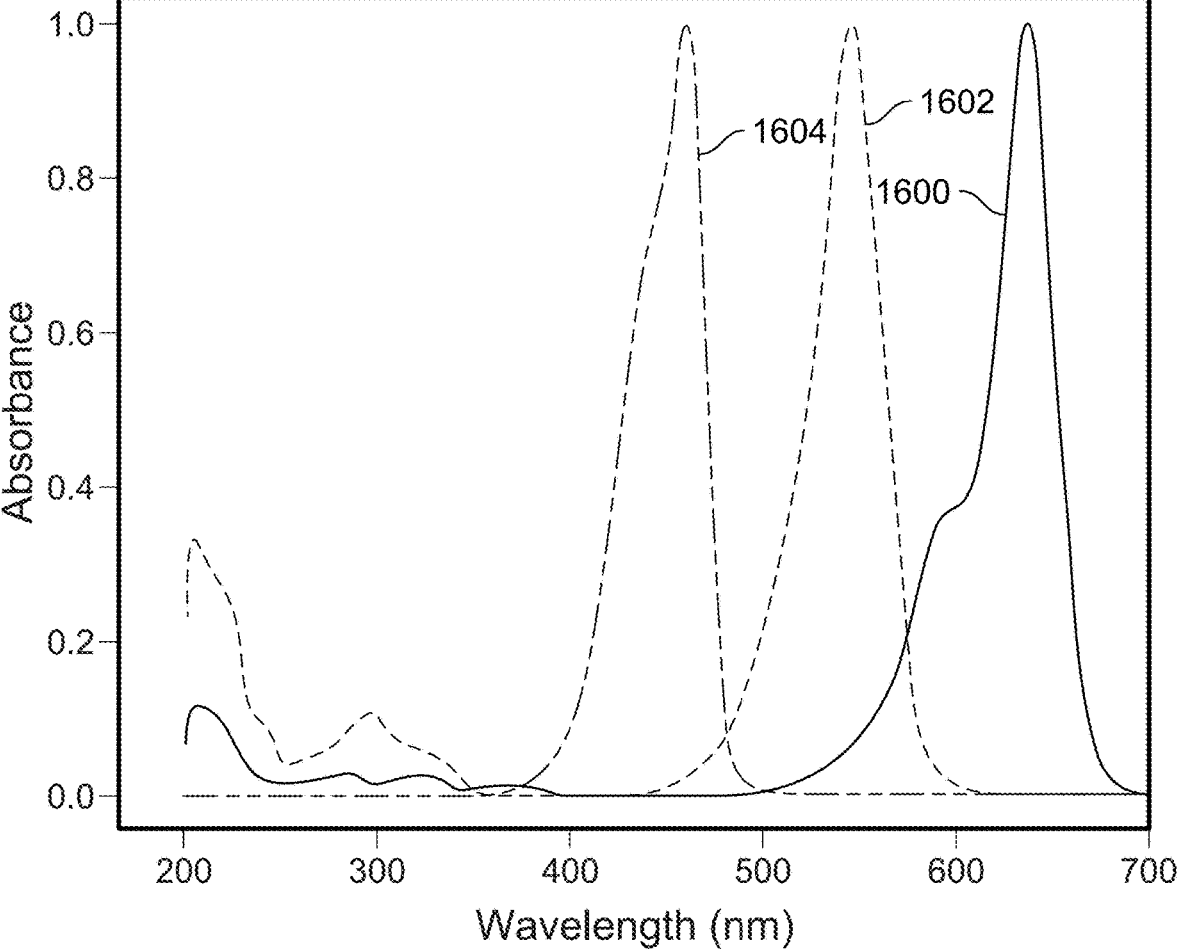
FIG. 16 shows overlaid absorbance spectra of red, green, and blue colorants.
Figure 17:
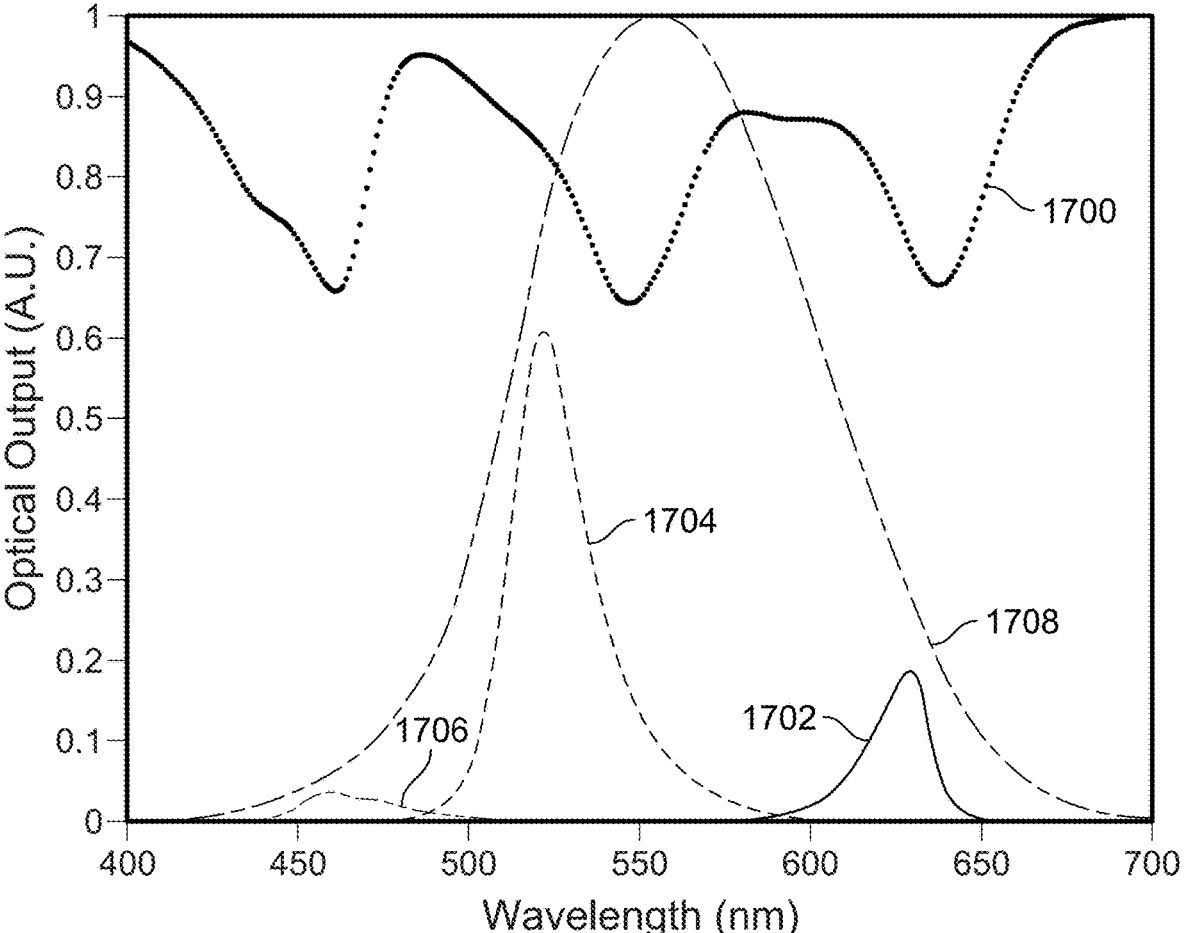
FIG. 17 shows a comparison of a simulation of the absorbance spectra of FIG. 16 and output of exemplary red, green, and blue light-emitting diodes.

Plots 1600, 1602, 1604 in FIG. 16 shows overlaid absorbance spectra (absorbance versus wavelength) of individual QCR Solutions Dye VIS637A (red), VIS548B (green), and VIS461B (blue), respectively, exhibiting little absorption in the UV band. Plot 1700 in FIG. 17 shows optical output versus wavelength for a combination of QCR Solutions Dyes (33% VIS461, 33% VIS548, and 33% VIS637) from FIG. 16. Plots 1702, 1704, 1706 show optical output versus wavelength for example RBG light emitting diode output. Plot 1708 shows optical output versus wavelength for phototropic transmission illustrating absorption in RGB bands (RGB=0.735, 0.797, and 0.727, respectively).

Customized color-absorbing adhesive can be applied on an edge (e.g., as depicted in FIGS. 12A-12C and 13) or on any horizontal surface of a waveguide layer, inclusive of integrated spacers (e.g., as depicted in FIG. 15).

Refractive index matching of the adhesive (whether for inter-layer adhesive or edge absorber) can be obtained by utilizing a high index component along with methods described herein or by using a high refractive index UV cure adhesive and a matching colorant as described herein. Closer refractive index matching between the adhesive and waveguide layer can be achieved to reduce back reflections at an interface.

Colorants can be incorporated into a wide range of adhesives without limiting or restricting the dispensed thickness, dispensed area, or viscosity of the adhesive. A viscosity of the adhesive can be selected as appropriate for an intended application. A suitable viscosity range for edge seals is typically in a range of about 300 cP to about 3000 cP at application temperature (e.g., at room temperature). A suitable viscosity range for interlayer lamination without integrated spacers is typically in a range of about 27,000 cP to about 70,000 cP. A suitable viscosity range for interlayer lamination with adhesive dispensed on integrated spacers is typically less than about 20 cP. A thickness range of the adhesive also depends on intended applications. A suitable thickness for edge seals is typically in a range of about 50 µm to about 150 µm. A suitable thickness for interlayer lamination with integrated spacers is typically in a range of about 25 µm to about 250 µm. A suitable thickness for interlayer lamination with integrated spacers is typically in a range of about 1 µm to about 10 µm.

While this specification contains many specific details, these should not be construed as limitations on the scope of the disclosure or of what may be claimed, but rather as examples of features that are associated with particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

A number of embodiments have been described. Nevertheless, it will be understood that various modifications may be made without departing from the spirit and scope of the disclosure. For example, various structures shown above may be used, with elements rearranged, positioned differently, oriented differently, added, and/or removed. Accordingly, other embodiments are within the scope of the following claims.

What is claimed is:

1. A display device comprising:
   a polymer waveguide comprising:
     one or more patterned regions comprising an incoupling grating configured to incouple light of one or more colors; and
     one or more unpatterned regions,
     wherein the polymer waveguide comprises a light-absorbing chromatic component and is configured to: absorb at least 90% of light of one or more wavelength ranges traveling through the polymer waveguide and that the incoupling grating is not configured to incouple.

2. The display device of claim 1, wherein the incoupling grating is configured to incouple one or more of red light, green light, and blue light.

3. The display device of claim 2, wherein the light of one or more wavelength ranges comprises one or more of red light, green light, and blue light that the incoupling grating is not configured to incouple.

4. The display device of claim 1, wherein the chromatic component is configured to absorb at least 90% of infrared light.

5. The display device of claim 1, wherein a concentration of the chromatic component varies across the waveguide.

6. The display device of claim 5, wherein the concentration of the chromatic component decreases from a region on a side of the waveguide proximate the incoupling grating to an other region on a side of the waveguide opposite the incoupling grating.

7. The display device of claim 1, wherein the chromatic component defines an area at least partially surrounding the incoupling grating.

8. The display device of claim 7, wherein the area forms a ring that completely encircles the incoupling grating.

9. The display device of claim 1, wherein polymer waveguide comprises an other chromatic component configured to absorb light of a different wavelength range than the chromatic component.

10. The display device of claim 9, wherein the other chromatic component defines an area at least partially encircling the incoupling grating.

11. The display device of claim 1, wherein a total internal reflection path length of the polymer waveguide is in a range of about 2 cm to about 15 cm.

12. A method of forming a polymer waveguide, the method comprising:

contacting a polymerizable material with a mold, wherein:

the mold forms a pattern in the polymerizable material, the pattern defining an incoupling grating configured to incouple light of one or more colors; and wherein the polymerizable material comprises a light-absorbing chromatic component;

polymerizing the polymerizable material to form a patterned polymer attached to the mold; and separating the patterned polymer from the mold, wherein the polymerizable material is configured to absorb at least 90% of light of one or more wavelength ranges traveling through the polymer and that the ICG is not configured to incouple.

13. The method of claim 12, wherein the polymerizable material comprises a resin and the chromatic component comprises a dye.

14. The method of claim 12, wherein contacting the polymerizable material with the mold comprises dispensing the polymerizable material on the mold.

15. The method of claim 14, wherein contacting the polymerizable material with the mold comprises dispensing polymerizable material with different concentrations of the chromatic component at different locations on the mold.

16. The method of claim 15, wherein dispensing polymerizable material with different concentrations of the chromatic component at different locations on the mold comprises dispensing polymerizable material without the chromatic component at at least one of the different locations.

17. The method of claim 16, wherein the pattern in the polymerizable material formed by the mold further defines an outcoupling optical element.

18. The method of claim 17, wherein the polymerizable material with the chromatic component is disposed in an area of the mold corresponding to the incoupling grating, and wherein the polymerizable material without the chromatic component is disposed in an area of the mold corresponding to the outcoupling grating.

19. The method of claim 12, wherein polymerizing the polymerizable material comprises irradiating the polymerizable material with ultraviolet radiation.

20. The method of claim 12, wherein the incoupling grating is configured to incouple one or more of red light, green light, and blue light, and wherein the light of one or more wavelength ranges comprises one or more of red light, green light, and blue light that the incoupling grating is not configured to incouple.

* * * * *